United States Patent
Sakaguchi et al.

(10) Patent No.: US 12,296,418 B2
(45) Date of Patent: May 13, 2025

(54) MOVING BLADE REMOVING DEVICE AND MOVING BLADE REMOVAL METHOD

(71) Applicant: MITSUBISHI HEAVY INDUSTRIES, LTD., Tokyo (JP)

(72) Inventors: Tadakazu Sakaguchi, Tokyo (JP); Riku Uesato, Takasago (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/288,909

(22) PCT Filed: May 24, 2022

(86) PCT No.: PCT/JP2022/021198
§ 371 (c)(1),
(2) Date: Oct. 30, 2023

(87) PCT Pub. No.: WO2022/250039
PCT Pub. Date: Dec. 1, 2022

(65) Prior Publication Data
US 2024/0198465 A1    Jun. 20, 2024

(30) Foreign Application Priority Data

May 26, 2021    (JP) .................................. 2021-088264

(51) Int. Cl.
*B23P 19/04* (2006.01)
*F01D 25/00* (2006.01)

(52) U.S. Cl.
CPC ............ *B23P 19/045* (2013.01); *F01D 25/00* (2013.01); *F05D 2230/70* (2013.01)

(58) Field of Classification Search
CPC ........ B23P 19/045; F01D 25/00; F01D 25/28; F01D 25/285; F05D 2230/70; F04D 29/38; F04D 29/64
See application file for complete search history.

(56) References Cited

U.S. PATENT DOCUMENTS

| 4,455,730 A | 6/1984 | Guenther |
| 6,141,862 A | 11/2000 | Matsui et al. |

(Continued)

FOREIGN PATENT DOCUMENTS

| JP | 59-51197 | 3/1984 |
| JP | 2017-122421 | 7/2017 |

(Continued)

OTHER PUBLICATIONS

International Search Report issued Aug. 2, 2022 in International (PCT) Application No. PCT/JP2022/021198, with English-language translation.

(Continued)

*Primary Examiner* — Lee A Holly
(74) *Attorney, Agent, or Firm* — Wenderoth, Lind & Ponack, L.L.P.

(57) ABSTRACT

A moving blade removing device includes a pushing-out mechanism and a frame attached to the pushing-out mechanism. The pushing-out mechanism includes a contacting end to contact a moving blade, and a drive mechanism for moving the contacting end. The frame includes a base, a reaction force accepting portion, and a push accepting portion in a second base end portion of the base. The base has an outer circumference contacting surface facing the first height side to contact an outer circumferential surface of a disk. The reaction force accepting portion has an end contacting surface facing a second movement side to contact a first end surface of the disk. The push accepting portion has a mechanism contacting surface facing a first movement side and coming into contact with a mechanism end surface of the drive mechanism facing the second movement side.

13 Claims, 12 Drawing Sheets

(56) References Cited

U.S. PATENT DOCUMENTS

| | | | |
|---|---|---|---|
| 9,494,040 B2 | 11/2016 | Bird | |
| 2006/0039790 A1* | 2/2006 | Hartmann | B23P 6/002 |
| | | | 416/220 R |
| 2010/0162546 A1 | 7/2010 | Kalmar et al. | |
| 2015/0128417 A1 | 5/2015 | Laborde | |
| 2015/0218948 A1* | 8/2015 | Bird | F01D 5/3007 |
| | | | 29/889.1 |
| 2019/0003309 A1* | 1/2019 | Yoshida | F01D 25/00 |
| 2023/0035117 A1 | 2/2023 | Takeuchi | |

FOREIGN PATENT DOCUMENTS

| | | |
|---|---|---|
| JP | 2021-162001 | 10/2021 |
| KR | 10-0231174 | 11/1999 |

OTHER PUBLICATIONS

Written Opinion of the International Searching Authority issued Aug. 2, 2022 in International (PCT) Application No. PCT/JP2022/021198, with English-language translation.

\* cited by examiner

MOVING BLADE REMOVING DEVICE AND MOVING BLADE REMOVAL METHOD

TECHNICAL FIELD

The present invention relates to a removing device for a rotor blade in an axial flow rotary machine and a method of removing a rotor blade.

Priority is claimed on Japanese Patent Application No. 2021-088264 filed on May 26, 2021, the content of which is incorporated herein by reference.

BACKGROUND ART

An axial compressor, which is a type of axial flow rotary machine, includes a rotor that rotates around an axis and a casing that covers the rotor. The rotor includes a rotor shaft and a plurality of rotor blade rows attached to the rotor shaft. The rotor blade rows are arranged in an axial direction in which the axis extends. Each of the rotor blade rows includes a plurality of rotor blades arranged in a circumferential direction with respect to the axis. Note that, for the sake of convenience in the following description, one of both sides in the axial direction will be referred to as an axial upstream side and the other of both sides in the axial direction will be referred to as an axial downstream side.

Disclosed in PTL 1 below is an axial compressor. A rotor shaft of the axial compressor includes a disk for each of a plurality of rotor blade rows. Each of a plurality of the disks has a disk shape centered on an axis. The rotor shaft is configured by stacking the plurality of disks in an axial direction. Each disk includes an outer peripheral surface, a front end surface, a rear end surface, and a plurality of blade root grooves. The front end surface extends to a radial inner side with respect to the axis from an edge of the outer peripheral surface that is on an axial upstream side. The rear end surface extends to a radial inner side from an edge of the outer peripheral surface that is on an axial downstream side. Each of the plurality of blade root grooves is recessed toward a radial inner side from the outer peripheral surface and extends from the rear end surface in a twisting direction with respect to the axial direction to penetrate to the front end surface. Each of a plurality of rotor blades includes a blade body that extends in a radial direction and a blade root that is provided on the radial inner side with respect to the blade body and that is fitted to the blade root groove.

Further, PTL 1 discloses a removing device for a rotor blade attached to a disk. The removing device includes a support portion composed of a plurality of blocks, and a punch supported by the support portion. An operator disposes the removing device on the axial downstream side with respect to a rotor blade and then disposes the support portion of the removing device between two disks that are adjacent to each other in the axial direction. Specifically, the support portion is disposed between a rear end surface of an upstream-side disk which is one of the two disks and is disposed on the axial upstream side and a front end surface of a downstream-side disk which is disposed on the axial downstream side. As a result, the support portion becomes not able to move relative to each disk in the axial direction. In this state, a tip end of the punch can come into contact with an end surface of a blade root fitted to the upstream-side disk. Next, the operator drives the punch and moves the blade root to the axial upstream side by means of the punch.

When the blade root is moved to the axial upstream side, a force in a direction from the blade root to the axial downstream side acts on the punch and the support portion. A reaction force against such a force acts on the support portion from the front end surface of the downstream-side disk, so that movement of the support portion in the axial direction is restricted. Therefore, a surface of the support portion that is positioned closest to the axial downstream side and that faces the axial downstream side serves as a reaction force receiving surface. As described above, the reaction force receiving surface of the removing device is positioned closer to the axial downstream side than a blade to be removed is.

CITATION LIST

Patent Literature

[PTL 1] U.S. patent application, Publication No. 2015-0218948

SUMMARY OF INVENTION

Technical Problem

In the case of the removing device for a rotor blade that is described in PTL 1, the support portion needs to be disposed between the rear end surface of the upstream-side disk and the front end surface of the downstream-side disk. Therefore, a distance between the rear end surface of the upstream-side disk and the front end surface of the downstream-side disk needs to be equal to or larger than a predetermined distance. Therefore, in a case where the distance between the rear end surface of the upstream-side disk and the front end surface of the downstream-side disk is smaller than the predetermined distance, the removing device for a rotor blade that is described in PTL 1 cannot be used.

Therefore, an object of the present disclosure is to provide a technique with which it is possible to remove a rotor blade from a disk even in a case where a distance between a rear end surface of an upstream-side disk and a front end surface of a downstream-side disk is small.

Solution to Problem

According to an aspect of the invention, in order to achieve the above-described object, there is provided a rotor blade removing device for removal of a rotor blade from a disk. The disk includes an outer peripheral surface that extends in a circumferential direction around an axis, a first end surface that faces a first axial side which is one of both sides in an axial direction in which the axis extends, a second end surface that faces a second axial side opposite to the first axial side, and a blade root groove. The first end surface extends toward a radial inner side with respect to the axis from an edge of the outer peripheral surface that is on the first axial side. The second end surface extends toward the radial inner side from an edge of the outer peripheral surface that is on the second axial side. The blade root groove being recessed toward the radial inner side from the outer peripheral surface and extends from the second end surface in a groove penetration direction twisted with respect to the axial direction to penetrate to the first end surface. The rotor blade includes a blade body of which a cross-sectional shape perpendicular to a radial direction with respect to the axis is a blade-like shape and that extends in the radial direction and a blade root that is provided on the radial inner side with respect to the blade body and that is fitted to the blade root groove.

The rotor blade removing device includes a pushing-out mechanism and a frame to which the pushing-out mechanism is attached. The pushing-out mechanism includes a contact end that can come into contact with the rotor blade and a driving mechanism that moves the contact end in a movement direction. The frame includes a base that extends in the movement direction, a reaction force receiving portion that extends toward a first height side, which is one of both sides in a height direction different from the movement direction, from a first base end portion, which is an end portion of the base that is on a first movement side which is one of both sides in the movement direction, and a pressing receiving portion that is provided on a second base end portion, which is an end portion of the base that is on a second movement side opposite to the first movement side. The base includes an outer peripheral contact surface that faces the first height side and that can come into contact with the outer peripheral surface. The reaction force receiving portion extends toward the first height side from an end of the outer peripheral contact surface that is on the first movement side and includes an end contact surface that faces the second movement side and that can come into contact with the first end surface. The pressing receiving portion includes a mechanism contact surface that faces the first movement side and that can come into contact with a mechanism end surface that faces the second movement side at the driving mechanism.

In the present aspect, when the rotor blade is to be moved to the first movement side, a reaction force in a direction from the disk to the first movement side is caused to act on the frame on which the force in the direction from the rotor blade to the second movement side acts, so that the frame is prevented from moving to the second movement side. At this time, the reaction force receiving portion of the frame receives the reaction force from the disk to which the rotor blade to be removed is attached. In the present aspect, although the contact end is disposed on the second movement side with respect to the rotor blade, the reaction force receiving portion that receives the reaction force from the disk, to which the rotor blade to be removed is attached, is provided at the first base end portion, which is the end portion of the base that is on the first movement side. Therefore, in the present aspect, the size of a portion of the rotor blade removing device in the present aspect that is positioned on the second movement side with respect to the rotor blade to be removed can be reduced in comparison with a case where the entire rotor blade removing device is disposed on the second movement side with respect to the rotor blade to be removed.

Therefore, in the present aspect, the rotor blade removing device can be disposed on the disk to which the rotor blade to be removed is attached even in a case where a distance between the second end surface of the disk to which the rotor blade to be removed is attached and the first end surface of another disk that is adjacent to the disk while being on the second axial side with respect to the disk is short.

According to an aspect of the invention, in order to achieve the above-described object, there is provided a rotor blade removal method for removal of a rotor blade from a disk. The disk includes an outer peripheral surface that extends in a circumferential direction around an axis, a first end surface that faces a first axial side which is one of both sides in an axial direction in which the axis extends, a second end surface that faces a second axial side opposite to the first axial side, and a blade root groove. The first end surface extends toward a radial inner side with respect to the axis from an edge of the outer peripheral surface that is on the first axial side. The second end surface extends toward the radial inner side from an edge of the outer peripheral surface that is on the second axial side. The blade root groove being recessed toward the radial inner side from the outer peripheral surface and extends from the second end surface in a groove penetration direction twisted with respect to the axial direction to penetrate to the first end surface. The rotor blade includes a blade body of which a cross-sectional shape perpendicular to a radial direction with respect to the axis is a blade-like shape and that extends in the radial direction and a blade root that is provided on the radial inner side with respect to the blade body and that is fitted to the blade root groove.

The rotor blade removal method includes executing a preparation step of preparing a rotor blade removing device, executing a device alignment step of disposing the rotor blade removing device on the disk, and executing a rotor blade moving step of operating the rotor blade removing device such that the rotor blade attached to the disk is moved. The rotor blade removing device prepared in the preparation step includes a pushing-out mechanism, and a frame to which the pushing-out mechanism is attached. The pushing-out mechanism includes a contact end that can come into contact with the rotor blade and a driving mechanism that moves the contact end in a movement direction. The frame includes a base that extends in the movement direction, a reaction force receiving portion that extends toward a first height side, which is one of both sides in a height direction different from the movement direction, from a first base end portion, which is an end portion of the base that is on a first movement side which is one of both sides in the movement direction, and a pressing receiving portion that is provided on a second base end portion, which is an end portion of the base that is on a second movement side opposite to the first movement side. The base includes an outer peripheral contact surface that faces the first height side and that can come into contact with the outer peripheral surface. The reaction force receiving portion extends toward the first height side from an end of the outer peripheral contact surface that is on the first movement side and includes an end contact surface that faces the second movement side and that can come into contact with the first end surface. The pressing receiving portion includes a mechanism contact surface that faces the first movement side and that can come into contact with a mechanism end surface that faces the second movement side at the driving mechanism. In the device alignment step, the movement direction of the contact end is made parallel to the groove penetration direction, the outer peripheral contact surface of the base is brought into contact with the outer peripheral surface, the end contact surface of the reaction force receiving portion is brought into contact with the first end surface, the contact end is disposed on the second movement side with respect to the rotor blade, and the contact end and the rotor blade are caused to face each other in the movement direction. In the rotor blade moving step, the driving mechanism is driven such that the contact end is moved to the first movement side and the rotor blade is moved to the first movement side.

In the rotor blade removal method of the present aspect, as with the rotor blade removing device in the first aspect, the rotor blade removing device can be disposed on the disk to which the rotor blade to be removed is attached even in a case where a distance between the second end surface of the disk to which the rotor blade to be removed is attached and the first end surface of another disk that is adjacent to the disk while being on the second axial side with respect to the disk is short.

Advantageous Effects of Invention

According to the aspects of the present invention, it is possible to remove a rotor blade from a disk even in a case where a distance between a rear end surface of an upstream-side disk and a front end surface of a downstream-side disk is small.

DESCRIPTION OF EMBODIMENTS

Hereinafter, embodiments of the present invention and a modification example thereof will be described in detail with reference to the drawings.

[Embodiment of Axial Flow Rotary Machine]

Figure 1:
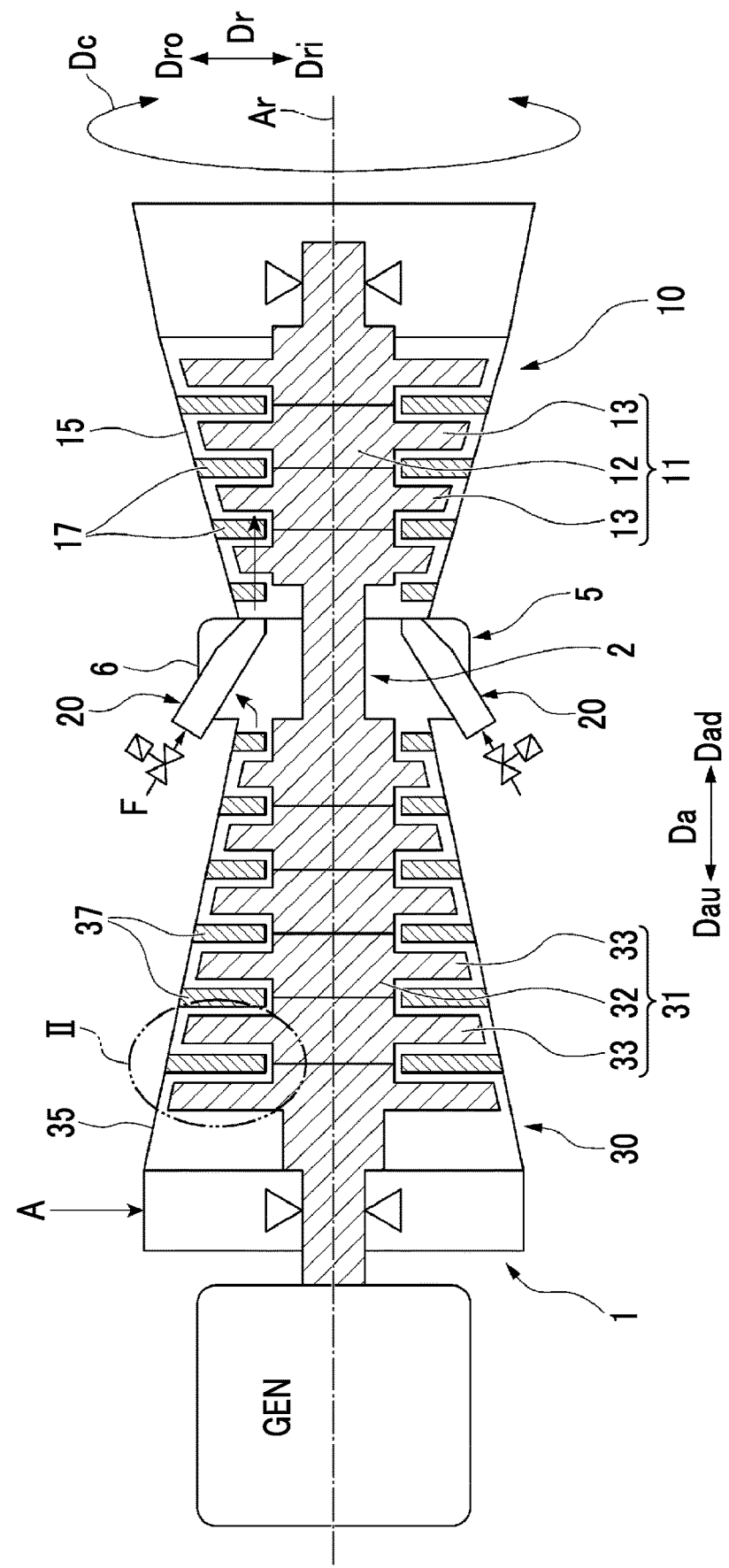
FIG. 1 is a schematic cross-sectional view of a gas turbine according to an embodiment of the present disclosure.
Figure 2:
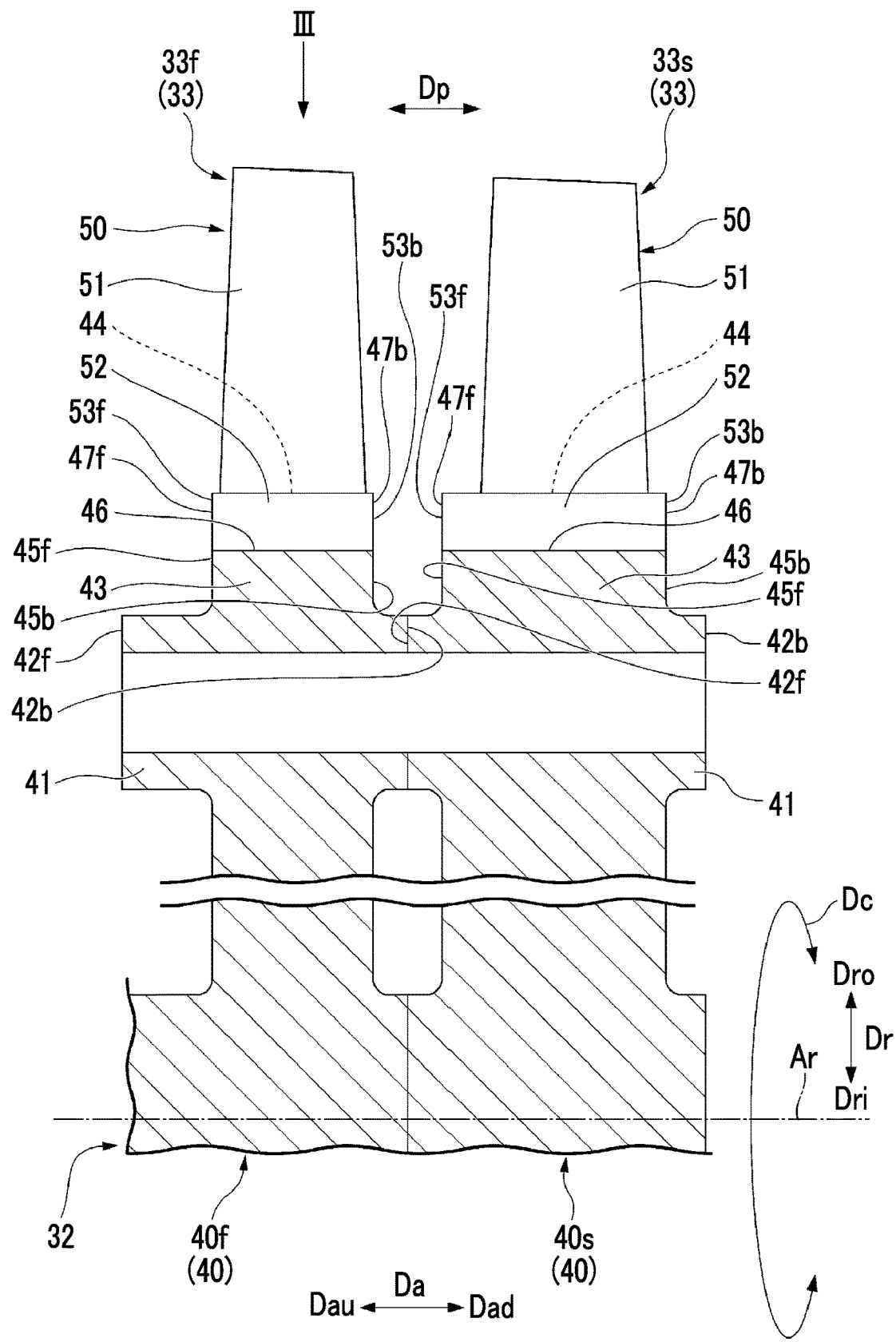
FIG. 2 is a detailed view showing part II of FIG. 1.
Figure 3:
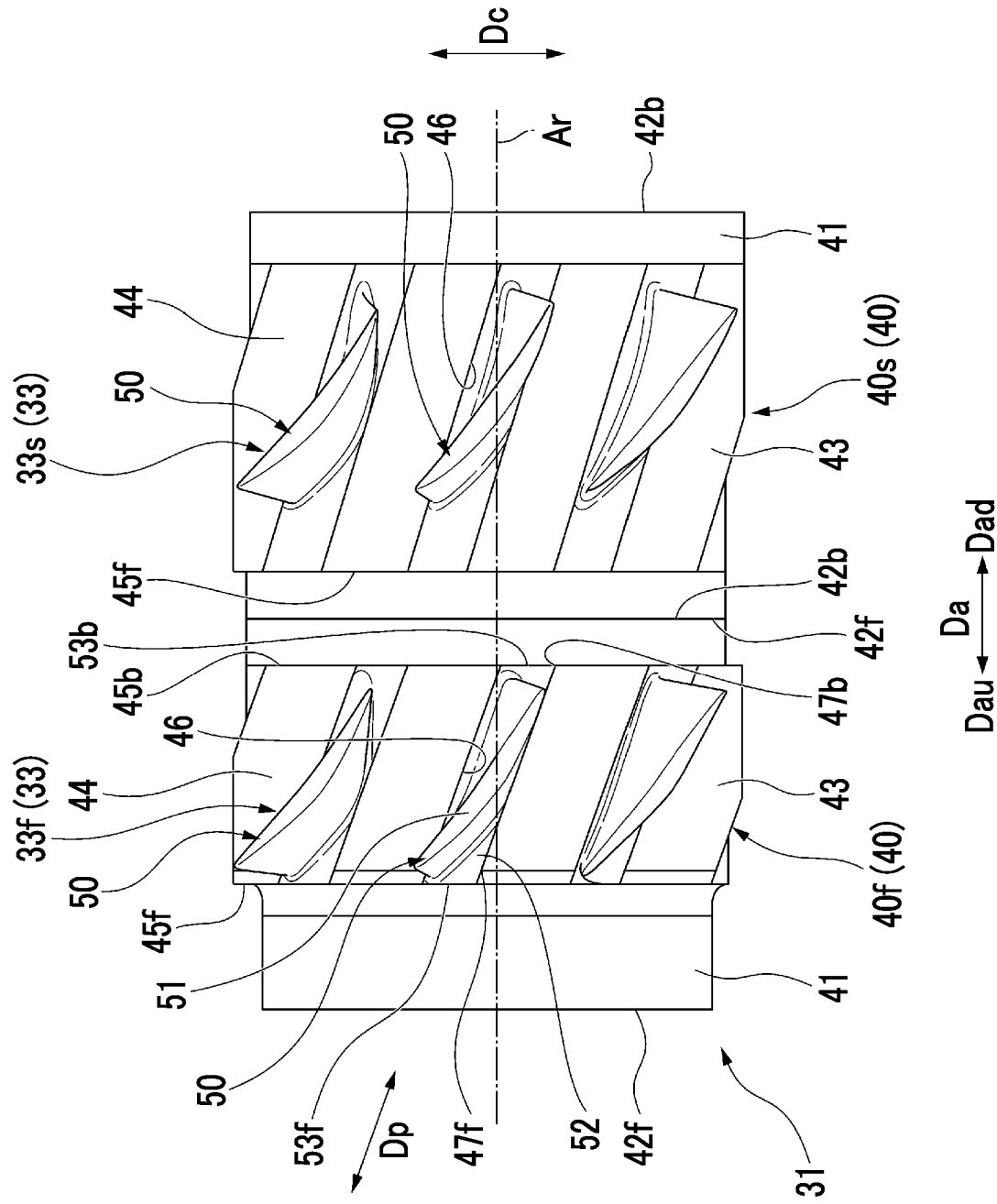
FIG. 3 is a view as seen along arrow III in FIG. 2.

First, an axial flow rotary machine to which a rotor blade removing device and a rotor blade removal method are applied will be described with reference to FIGS. 1 to 3.

The axial flow rotary machine to which the rotor blade removing device and the rotor blade removal method are applied is a compressor of a gas turbine. As shown in FIG. 1, the gas turbine 1 includes a compressor 30 that compresses air A, a combustor 20 that combusts fuel F in the air A, which has been compressed by the compressor 30, to generate combustion gas G, and a turbine 10 that is driven by the combustion gas G.

The compressor 30 includes a compressor rotor 31 that rotates around an axis Ar, a compressor casing 35 that covers the compressor rotor 31, and a plurality of stator vane rows 37. The turbine 10 includes a turbine rotor 11 that rotates around the axis Ar, a turbine casing 15 that covers the turbine rotor 11, and a plurality of stator vane rows 17. Here, a direction in which the axis Ar extends will be referred to as an axial direction Da, a circumferential direction around the axis Ar will be simply referred to as a circumferential direction Dc, and a direction perpendicular to the axis Ar will be referred to as a radial direction Dr. Additionally, one of both sides in the axial direction Da will be referred to as an axial upstream side Dau and a side opposite thereto will be referred to as an axial downstream side Dad. Furthermore, a side close to the axis Ar in the radial direction Dr will be referred to as a radial inner side Dri and a side opposite thereto will be referred to as a radial outer side Dro.

The compressor 30 is disposed closer to the axial upstream side Dau than the turbine 10 is. The compressor rotor 31 and the turbine rotor 11 are positioned on the same axis Ar and are connected to each other to form a gas turbine rotor 2. For example, a rotor of a generator GEN is connected to the gas turbine rotor 2. The gas turbine 1 further includes an intermediate casing 6. The intermediate casing 6 is disposed between the compressor casing 35 and the turbine casing 15 in the axial direction. The combustor 20 is attached to the intermediate casing 6. The compressor casing 35, the intermediate casing 6, and the turbine casing 15 are connected to each other to form a gas turbine casing 5.

The turbine rotor 11 includes a rotor shaft 12 that is centered on the axis Ar and that extends in the axial direction Da and a plurality of rotor blade rows 13 attached to the rotor shaft 12. The plurality of rotor blade rows 13 are arranged in the axial direction Da. Each of the rotor blade rows 13 is composed of a plurality of rotor blades arranged in the circumferential direction Dc. For each of the plurality of the rotor blade rows 13, one of the plurality of stator vane rows 17 is disposed on the axial upstream side Dau. Each of the stator vane rows 17 is provided inside the turbine casing 15. Each of the stator vane rows 17 is composed of a plurality of stator vanes arranged in the circumferential direction Dc.

The compressor rotor 31 includes a rotor shaft 32 that is centered on the axis Ar and that extends in the axial direction Da and a plurality of rotor blade rows 33 attached to the rotor shaft 32. The plurality of rotor blade rows 33 are arranged in the axial direction Da. Each of all the rotor blade rows 33 is composed of a plurality of rotor blades arranged in the circumferential direction Dc. For each of the plurality of the rotor blade rows 33, one of the plurality of stator vane rows 37 is disposed on the axial downstream side Dad. Each of the stator vane rows 37 is provided inside the compressor casing 35. Each of the stator vane rows 37 is composed of a plurality of stator vanes arranged in the circumferential direction Dc.

The rotor shaft 32 of the compressor 30 includes a disk 40 for each of the plurality of rotor blade rows 33. Each of a plurality of the disks 40 has a disk shape centered on the axis Ar as shown in FIGS. 2 and 3. The rotor shaft 32 is configured by stacking the plurality of disks 40 in the axial direction Da. Each of a plurality of rotor blades 50 constituting the rotor blade rows 33 includes a blade body 51 that extends in the radial direction Dr and of which a cross-sectional shape perpendicular to the radial direction Dr is a blade-like shape and a blade root 52 that is provided on the radial inner side Dri with respect to the blade body 51. The blade root 52 includes a blade root front end surface 53*f* facing the axial upstream side Dau and a blade root rear end surface 53*b* facing the axial downstream side Dad. Note that in FIGS. 2 and 3, a first-stage rotor blade row 33*f* which is one of the plurality of rotor blade rows 33 and which is closest to the axial upstream side Dau, a first-stage disk 40*f* to which the first-stage rotor blade row 33f is attached, a second-stage rotor blade row 33s that is adjacent to the first-stage rotor blade row 33f while being on the axial downstream side Dad with respect to the first-stage rotor blade row 33f, and a second-stage disk 40s to which the second-stage rotor blade row 33s is attached are shown.

The disk-shaped disk 40 includes a disk-shaped body portion 41 centered on the axis Ar and a rotor blade attachment portion 43 formed on an outer periphery of the body portion 41. The body portion 41 includes an inner front end surface 42f facing the axial upstream side Dau and an inner rear end surface 42b facing the axial downstream side Dad. The inner rear end surface 42b has a back-to-back relationship with the inner front end surface 42f. The inner rear end surface 42b of the disk 40 is in contact with the inner front end surface 42f of another disk 40 that is adjacent to the disk 40 while being on the axial downstream side Dad with respect to the disk 40. The rotor blade attachment portion 43 includes an outer peripheral surface 44 that extends in the circumferential direction Dc around the axis Ar, an outer front end surface 45f facing the axial upstream side Dau, an outer rear end surface 45b facing the axial downstream side Dad, and a blade root groove 46. The outer front end surface 45f extends toward the radial inner side Dri from an edge of the outer peripheral surface 44 that is on the axial upstream side Dau. The outer front end surface 45f is positioned closer to the axial downstream side Dad than the inner front end surface 42f is. The outer rear end surface 45b extends toward the radial inner side Dri from an edge of the outer peripheral surface 44 that is on the axial downstream side Dad. The outer rear end surface 45b is positioned closer to the axial upstream side Dau than the inner rear end surface 42b is. Therefore, a distance between the outer front end surface 45f and the outer rear end surface 45b in the axial direction Da is shorter than a distance between the inner front end surface 42f and the inner rear end surface 42b in the axial direction Da. The blade root groove 46 is recessed toward the radial inner side Dri from the outer peripheral surface 44. The blade root groove 46 extends in a groove penetration direction Dp twisted with respect to the axial direction Da and penetrates the rotor blade attachment portion 43. For this reason, the blade root groove 46 includes a rear end opening 47b that is open at the outer rear end surface 45b and a front end opening 47f that is open at the outer front end surface 45f. The blade root 52 of the rotor blade 50 is fitted to the blade root groove 46.

[First Embodiment of Rotor Blade Removing Device]

A rotor blade removing device in the present embodiment will be described with reference to FIGS. 4 and 5.

Figure 4:
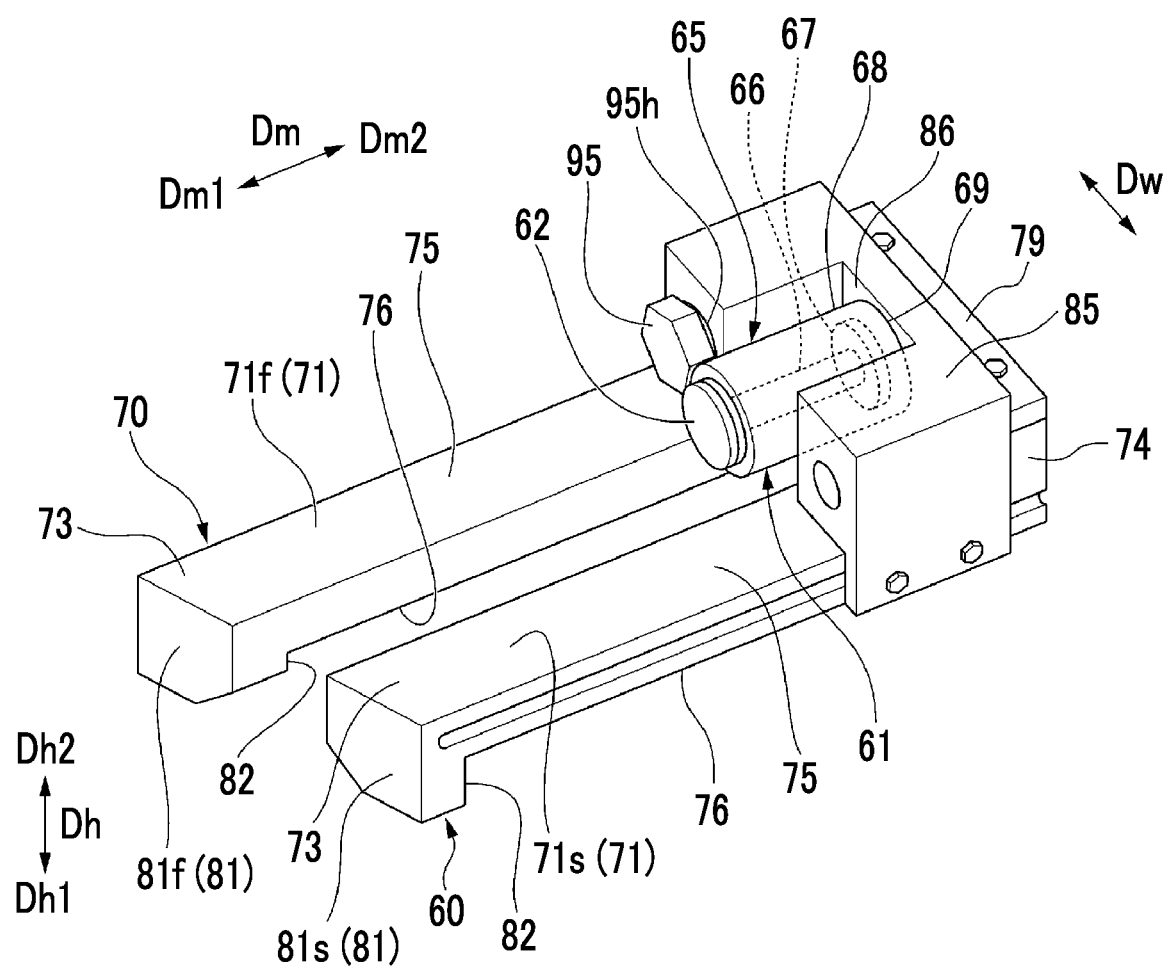
FIG. 4 is a perspective view of a rotor blade removing device according to a first embodiment of the present disclosure.
Figure 5:
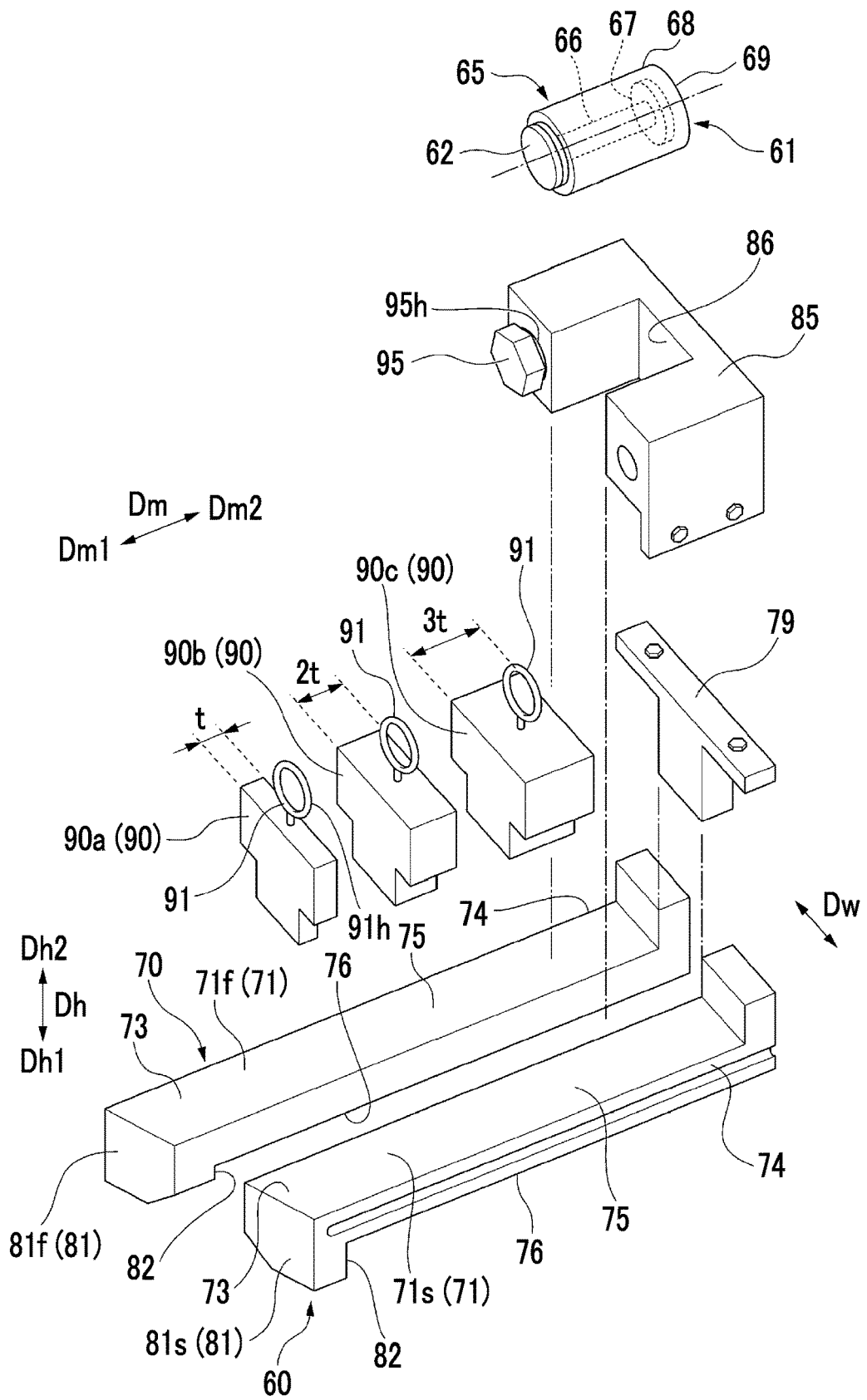
FIG. 5 is an exploded perspective view of the rotor blade removing device according to the first embodiment of the present disclosure.

As shown in FIGS. 4 and 5, a rotor blade removing device 60 of the present embodiment includes a pushing-out mechanism 61, a frame 70 to which the pushing-out mechanism 61 is attached, a plurality of spacers 90, and hooking tools 91 and 95.

The pushing-out mechanism 61 includes a contact end 62 that can come into contact with the rotor blade 50, and a hydraulic cylinder 65 serving as a driving mechanism that moves the contact end 62 in a movement direction Dm. Here, one of both sides in the movement direction Dm will be referred to as a first movement side Dm1 and the other of both sides in the movement direction Dm will be referred to as a second movement side Dm2. Additionally, a direction perpendicular to the movement direction Dm will be referred to as a height direction Dh and a direction perpendicular to the movement direction Dm and the height direction Dh will be referred to as a width direction Dw. Furthermore, one of both sides in the height direction Dh will be referred to as a first height side Dh1 and the other of both sides in the height direction Dh will be referred to as a second height side Dh2. The hydraulic cylinder 65 includes a piston rod 66 extending toward the second movement side Dm2 from the contact end 62, a piston 67 provided at an end of the piston rod 66 that is on the second movement side Dm2, and a cylinder casing 68 that covers the piston 67 such that the piston 67 is movable in the movement direction Dm. The cylinder casing 68 includes a casing bottom surface 69 that is positioned closest to the second movement side Dm2 than any other portions of the cylinder casing 68 is and that faces the second movement side Dm2. The casing bottom surface 69 is a mechanism end surface 69 of the driving mechanism which is the hydraulic cylinder 65.

The frame 70 includes bases 71, a base connection portion 79, reaction force receiving portions 81, and a pressing receiving portion 85.

The bases 71 include a first base 71f and a second base 71s extending in the movement direction Dm. The second base 71s is to be separated from the first base 71f in the width direction Dw. Each of the first base 71f and the second base 71s includes a first base end portion 73 which is an end portion on the first movement side Dm1, a second base end portion 74 which is an end portion on the second movement side Dm2, and a base intermediate portion 75 between the first base end portion 73 and the second base end portion 74. The base intermediate portion 75 includes an outer peripheral contact surface 76 that faces the first height side Dh1 and that can come into contact with the outer peripheral surface 44 of the disk 40.

The base connection portion 79 connects the first base 71f and the second base 71s that are disposed to be separated from each other in the width direction Dw. An end portion of the base connection portion 79 that is on one side in the width direction Dw is connected to the second base end portion 74 of the first base 71f by means of a bolt. Additionally, an end portion of the base connection portion 79 that is on the other side in the width direction Dw is connected to the second base end portion 74 of the second base 71s by means of a bolt.

The reaction force receiving portions 81 include a first reaction force receiving portion 81f and a second reaction force receiving portion 81s. The first reaction force receiving portion 81f extends toward the first height side Dh1 from the first base end portion 73 of the first base 71f. The second reaction force receiving portion 81s extends toward the first height side Dh1 from the first base end portion 73 of the second base 71s. The first reaction force receiving portion 81f extends toward the first height side Dh1 from an end of the outer peripheral contact surface 76 of the first base 71f that is on the first movement side Dm1 and includes an end contact surface 82 that faces the second movement side Dm2 and that can come into contact with the outer front end surface 45f of the disk 40. The second reaction force receiving portion 81s extends toward the first height side Dh1 from an end of the outer peripheral contact surface 76 of the second base 71s that is on the first movement side Dm1 and includes the end contact surface 82 that faces the second movement side Dm2 and that can come into contact with the outer front end surface 45f of the disk 40. Note that in the present embodiment, the first base 71f and the first reaction force receiving portion 81f are members integrated with each other. However, the first base 71f and the first reaction force receiving portion 81f may be formed as separate members and the first base 71f and the first reaction force receiving portion 81f may be connected to each other by means of a bolt or the like. Similarly, the second base 71s and the second reaction force receiving portion 81s may be formed as separate members and the second base 71s and the second reaction force receiving portion 81s may be connected to each other by means of a bolt or the like.

The pressing receiving portion 85 is provided over the second base end portion 74 of the first base 71f and the second base end portion 74 of the second base 71s while being provided closer to the first movement side Dm1 than the base connection portion 79 is. An end portion of the pressing receiving portion 85 that is on one side in the width direction Dw is connected to the second base end portion 74 of the first base 71f by means of a bolt. Additionally, an end portion of the pressing receiving portion 85 that is on the other side in the width direction Dw is connected to the second base end portion 74 of the second base 71s by means of a bolt. The pressing receiving portion 85 includes a mechanism contact surface 86 that faces the first movement side Dm1 and that can come into contact with the casing bottom surface 69 of the hydraulic cylinder 65. The mechanism contact surface 86 is positioned between the first base 71f and the second base 71s in the width direction Dw and is positioned closer to the second height side Dh2 than the outer peripheral contact surface 76 of the first base 71f and the outer peripheral contact surface 76 of the second base 71s are.

The pressing receiving portion 85 of the present embodiment is a member independent of the base connection portion 79. However, the pressing receiving portion 85 may have a function as a base connection portion, and the base connection portion 79 that is independent of the pressing receiving portion 85 may be omitted. Additionally, the pressing receiving portion 85 of the present embodiment is a member independent of the first base 71f and the second base 71s. However, the pressing receiving portion 85, the first base 71f, and the second base 71s may be members integrated with each other.

Figure 11:
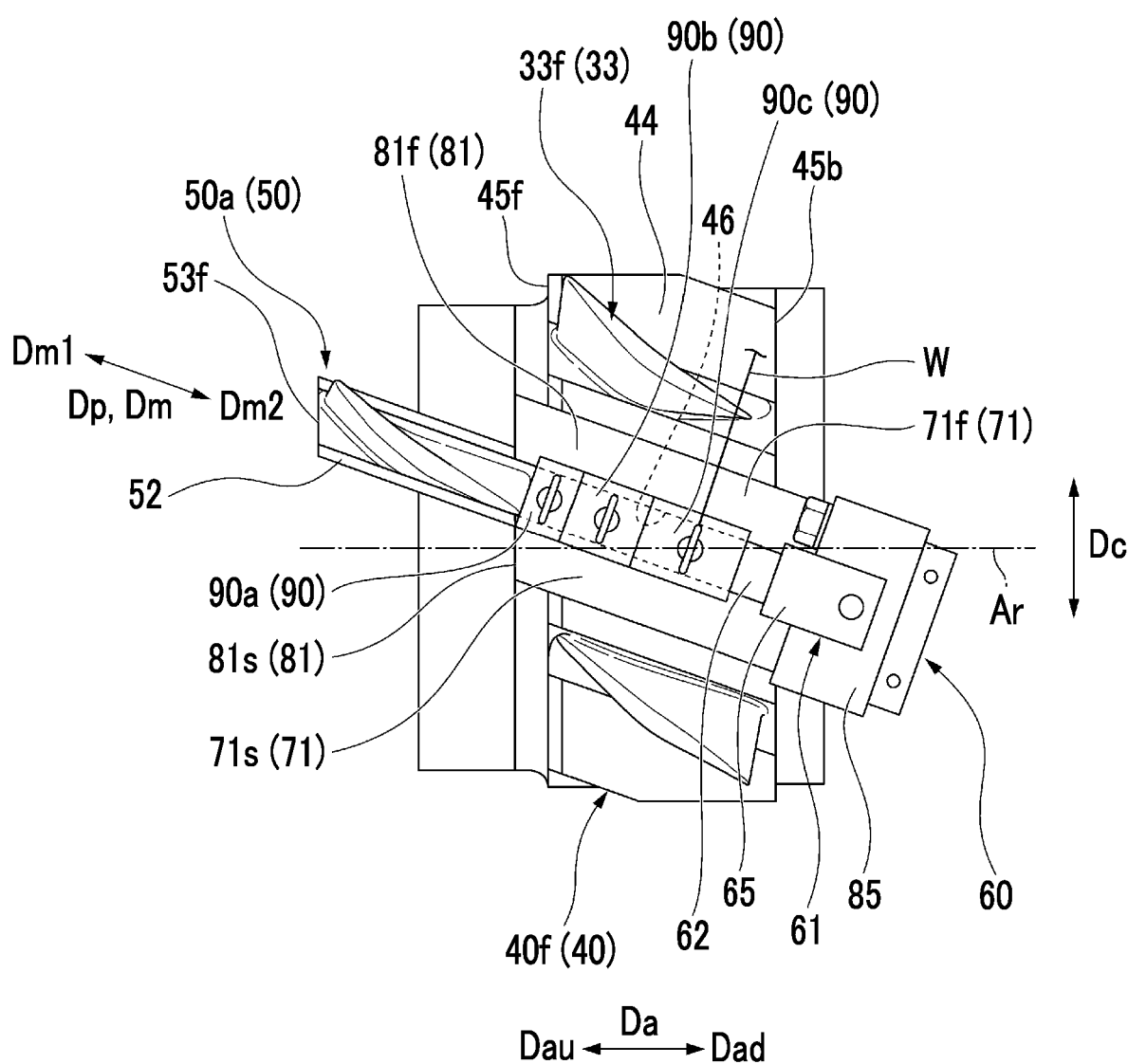
FIG. 11 is a plan view showing the main part of the rotor and the rotor blade removing device after a spacer alignment step in the first embodiment of the present disclosure.

The plurality of spacers 90 are plates of which the thicknesses are different from each other. A thickness t of a first spacer 90a, which is one of the plurality of spacers 90, is slightly smaller than the stroke of the hydraulic cylinder 65 (in other words, the movement distance of the contact end 62). A thickness 2t of a second spacer 90b, which is one of the plurality of spacers 90, is two times the thickness t of the first spacer 90a. A thickness 3t of a third spacer 90c, which is one of the plurality of spacers 90, is three times the thickness t of the first spacer 90a. Each of the spacers 90 is provided with the hooking tool 91. The hooking tool 91 includes a hooking portion 91h on which a wire W can be hooked. The hooking tool 91 in the present embodiment is, for example, an eye bolt. As shown in FIG. 11, the plurality of spacers 90 are disposed between the rotor blade 50 and the contact end 62 in the movement direction Dm.

The frame 70 is provided with the hooking tool 95. The hooking tool 95 includes a hooking portion 95h on which the wire W can be hooked. The hooking tool 95 in the present embodiment is, for example, a bolt. This bolt is screwed into the pressing receiving portion 85 of the frame 70. The bolt includes a bolt head having a hexagonal columnar shape and a cylindrical screw portion connected to the bolt head. The hooking portion 95h of the hooking tool 95 is a portion of the screw portion of the bolt that is on a bolt head portion side.

"Embodiment of Rotor Blade Removal Method"

Next, a rotor blade removal method in the present embodiment will be described with reference to a flowchart shown in FIG. 6.

In the rotor blade removal method of the present embodiment, a preparation step S1, a disk rotation step S2, a device alignment step S3, and a rotor blade moving step S4 are executed. Here, an example of the way in which one rotor blade 50 is removed from the first-stage disk 40f will be described.

First, the preparation step S1 is executed. In the preparation step S1, the rotor blade removing device 60 described above is prepared.

Figure 7:
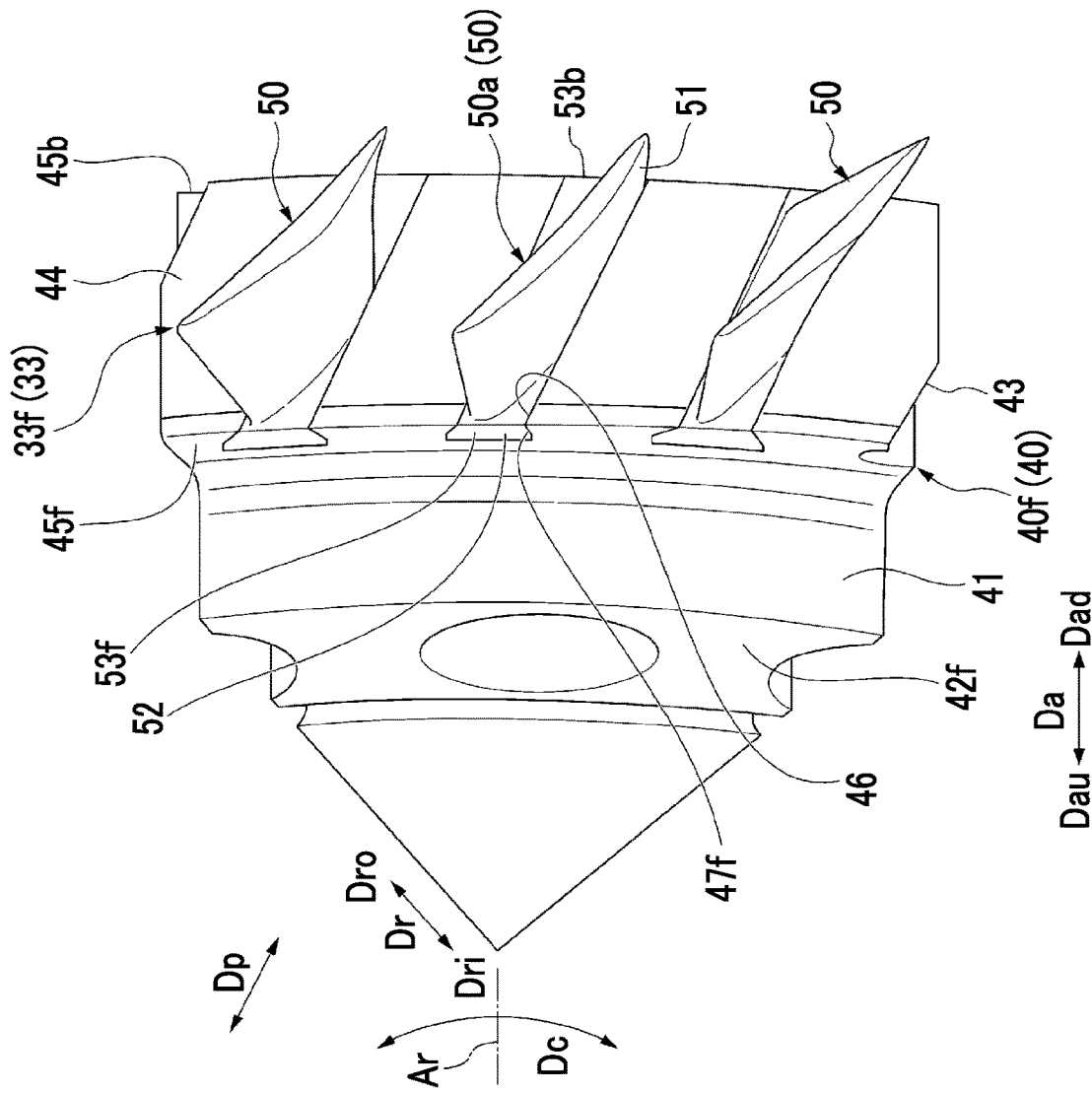
FIG. 7 is a perspective view showing a main part of a rotor after a disk rotation step in the embodiment of the present disclosure.

Next, the disk rotation step S2 is executed. In the disk rotation step S2, as shown in FIG. 7, the disk 40 is rotated around the axis Ar. At this time, at least a portion of the blade root front end surface 53f of a rotor blade 50a to be removed is positioned to be closer to an upper side than the axis Ar is and the blade root front end surface 53f is positioned to be closer to the upper side than the blade root rear end surface 53b is. Note that in a case where at least a portion of the blade root front end surface 53f of the rotor blade 50a to be removed has already been positioned to be closer to the upper side than the axis Ar is and the blade root front end surface 53f has already been positioned to be closer to the upper side than the blade root rear end surface 53b is, it is not necessary to rotate the disk 40.

Figure 8:
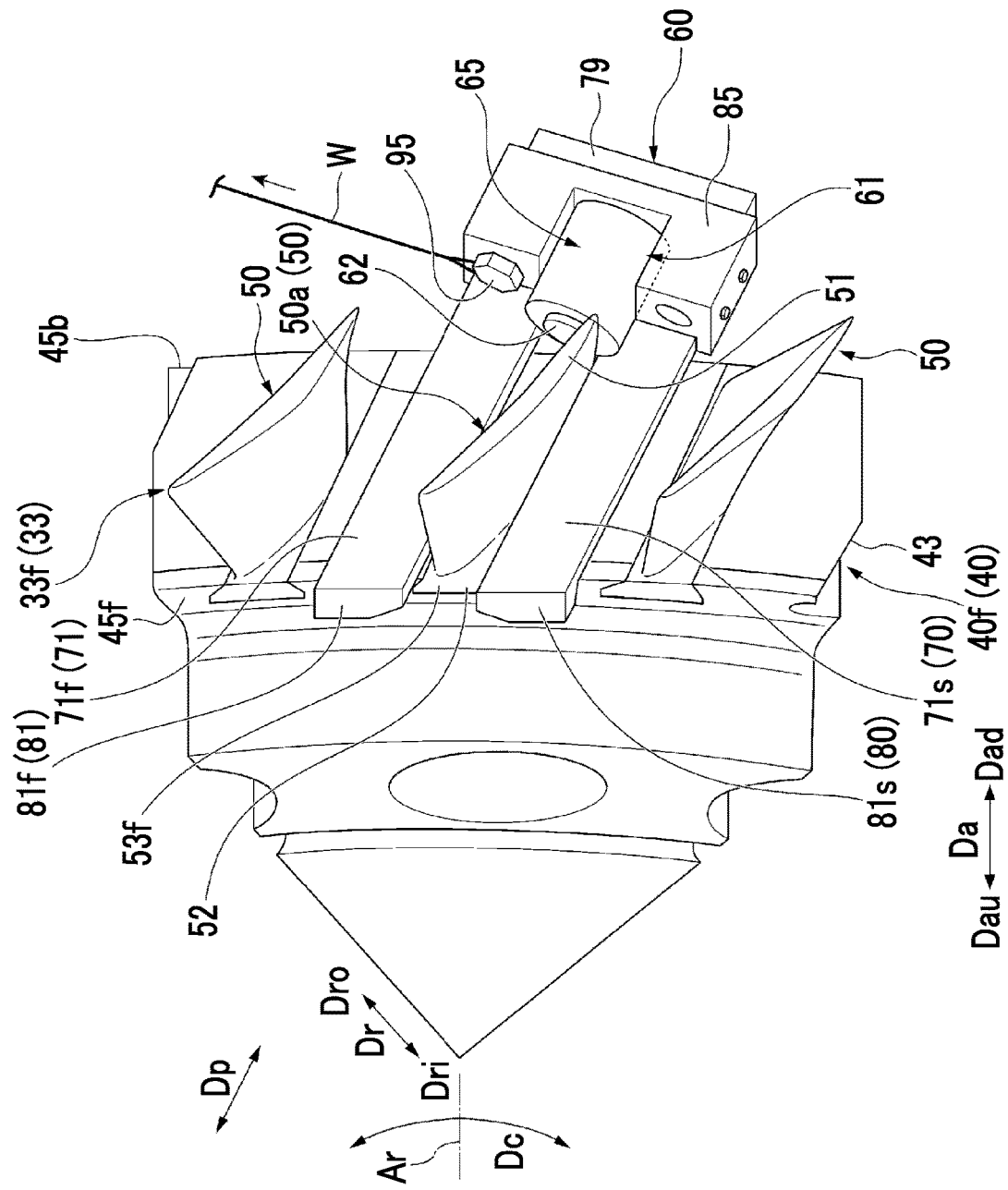
FIG. 8 is a perspective view showing the main part of the rotor and the rotor blade removing device after a device alignment step in the first embodiment of the present disclosure.
Figure 9:
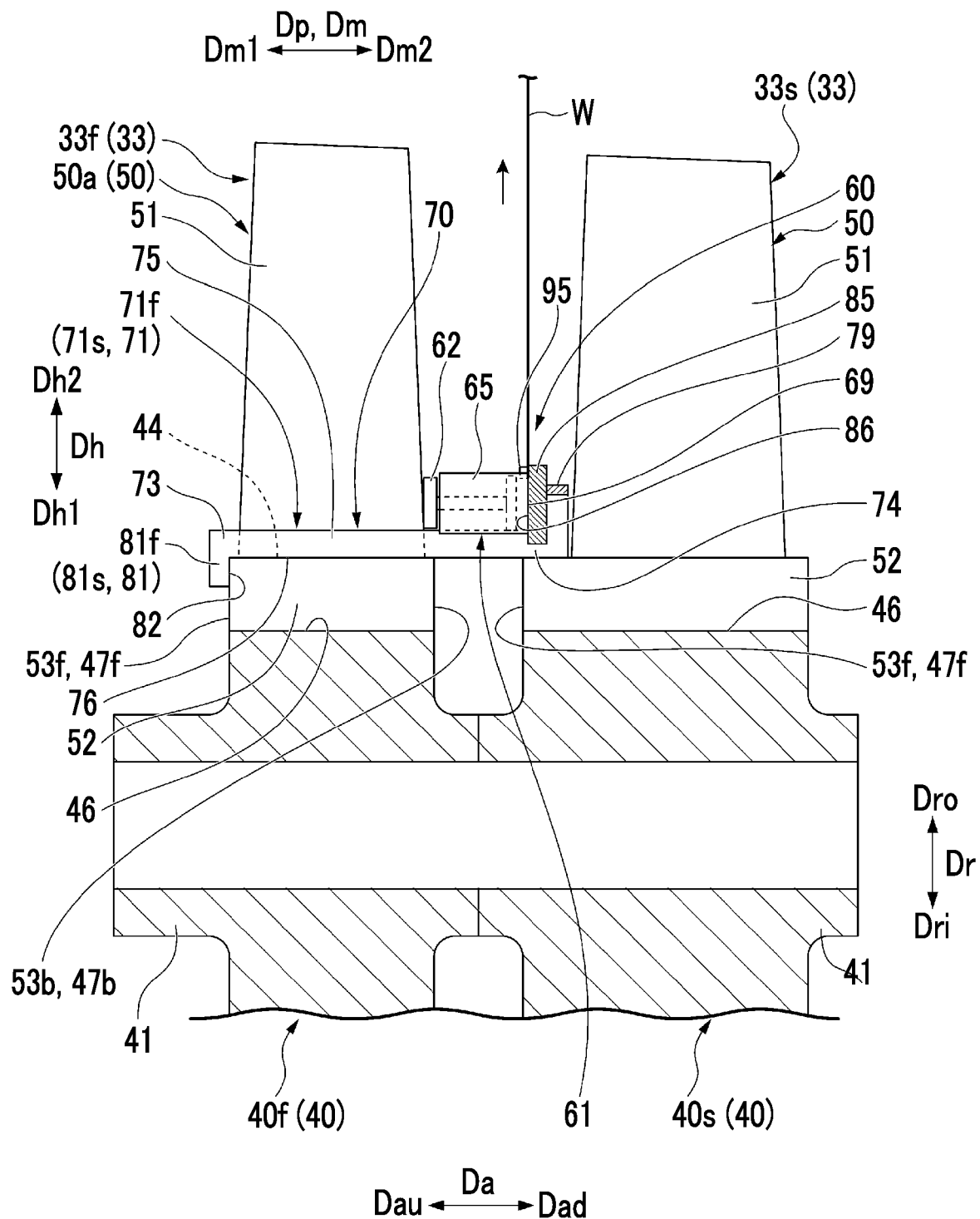
FIG. 9 is a cross-sectional view showing the main part of the rotor and the rotor blade removing device after the device alignment step in the first embodiment of the present disclosure.
Figure 10:
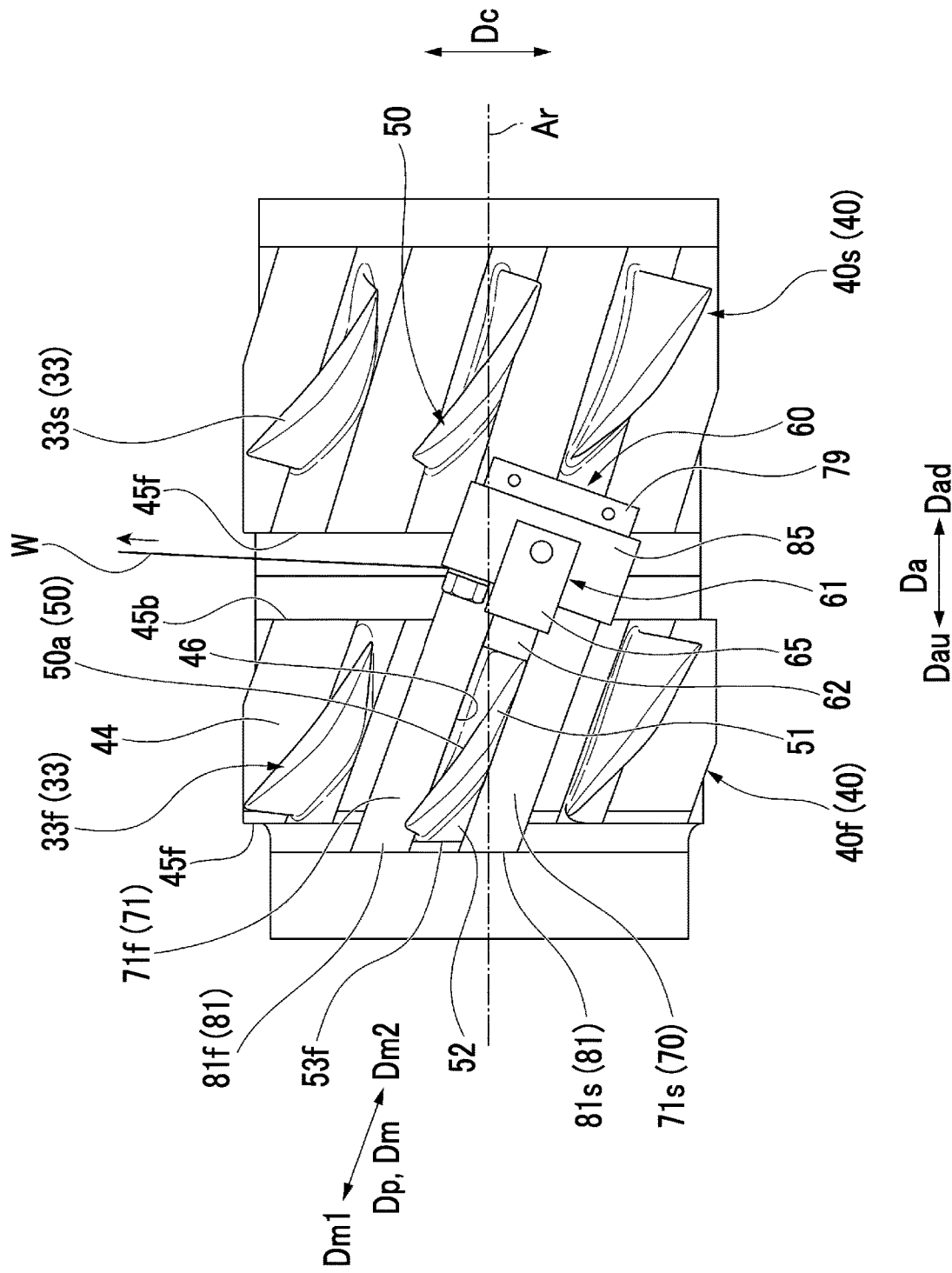
FIG. 10 is a plan view showing the main part of the rotor and the rotor blade removing device after a rotor blade moving step in the first embodiment of the present disclosure.

Next, the device alignment step S3 is executed. In the device alignment step S3, the rotor blade removing device 60 is disposed on the first-stage disk 40f as shown in FIGS. 8 to 10. Specifically, in the device alignment step S3, the following a) to d) are executed.

a) The frame 70 is disposed such that the rotor blade 50a to be removed is positioned between the first base 71f and the second base 71s and the movement direction Dm of the contact end 62 is made parallel to the groove penetration direction Dp of the blade root groove 46 to which the rotor blade 50a is fitted.

b) The outer peripheral contact surface 76 of the first base 71f and the outer peripheral contact surface 76 of the second base 71s are brought into contact with the outer peripheral surface 44 of the first-stage disk 40f.

c) The end contact surface 82 of the first reaction force receiving portion 81f and the end contact surface 82 of the second reaction force receiving portion 81s are brought into contact with the outer front end surface 45f of the first-stage disk 40f.

d) The contact end 62 of the pushing-out mechanism 61 is disposed on the second movement side Dm2 with respect to the rotor blade 50a to be removed, and the contact end 62 and the blade body 51 of the rotor blade 50a are caused to face each other in the movement direction Dm.

Additionally, in the device alignment step S3, a fall prevention process for the rotor blade removing device 60 is performed as necessary before execution of a) to d) described above. Specifically, one end of the wire W is attached to the hooking tool 95 provided on the frame 70 of the rotor blade removing device 60, and the other end of the wire W is attached to a fixation member that is present above the rotor blade 50a to be removed.

Note that the following a) and b) are the reasons why at least a portion of the blade root front end surface 53f of the rotor blade 50a to be removed is positioned to be closer to the upper side than the axis Ar is and the blade root front end surface 53f is positioned to be closer to the upper side than the blade root rear end surface 53b is in the above-described disk rotation step S2.

a) In a case where at least a portion of the blade root front end surface 53f of the rotor blade 50a to be removed is positioned to be closer to the upper side than the axis Ar is, a portion of the outer peripheral surface 44 of the first-stage disk 40f that is adjacent to the rotor blade 50a to be removed faces a direction including a component in a vertically upward direction. Therefore, because of the gravity acting on the bases 71, a contact property between the outer peripheral contact surfaces 76 of the bases 71 and a portion of the outer peripheral surface 44 of the first-stage disk 40f that is adjacent to the rotor blade 50a to be removed can be ensured.

b) In a case where the blade root front end surface 53f is positioned to be closer to the upper side than the blade root rear end surface 53b is, a portion of the rotor blade removing device 60 that is on the second movement side Dm2 is positioned below a portion of the rotor blade removing device 60 that is on the first movement side Dm1 when the rotor blade removing device 60 is disposed on the first-stage disk 40f. Therefore, among the components of the gravity acting on the rotor blade removing device 60, a component in the movement direction Dm becomes a component facing the second movement side Dm2. Therefore, the gravity causes the rotor blade removing device 60 to move to the second movement side Dm2. However, even in a case where the rotor blade removing device 60 is caused to move to the second movement side Dm2, the rotor blade removing device 60 cannot move to the second movement side Dm2 since the end contact surfaces 82 of the rotor blade removing device 60 are in contact with the outer front end surface 45f of the first-stage disk 40f.

Next, the rotor blade moving step S4 is executed. The rotor blade moving step S4 includes a first moving step S5, a determination step S6, a second moving step S7, and a spacer alignment step S8.

In the first moving step S5, as shown in FIG. 10, the hydraulic cylinder 65 is driven such that the blade body 51 of the rotor blade 50a is pushed in the first movement direction Dm1 by means of the contact end 62 and the rotor blade 50a is moved to the first movement side Dm1 together with the contact end 62.

When the hydraulic cylinder 65 is driven such that the rotor blade 50a is moved to the first movement side Dm1, a force in a direction from the rotor blade 50a to the second movement side Dm2 acts on the frame 70 supporting the hydraulic cylinder 65. A reaction force against this force acts on the reaction force receiving portions 81 of the frame 70 from the outer front end surface 45f of the first-stage disk 40f. Therefore, in the present embodiment, even while the rotor blade 50a is being moved to the first movement side Dm1 due to the driving of the hydraulic cylinder 65, the rotor blade removing device 60 does not move to the second movement side Dm2.

In the determination step S6, it is determined whether or not the blade root 52 of the rotor blade 50a has fallen off the blade root groove 46 as a result of the movement of the rotor blade 50a in the first moving step S5.

In a case where it is determined in the determination step S6 that the blade root 52 of the rotor blade 50a has not fallen off the blade root groove 46, the second moving step S7 is executed. In the second moving step S7, the hydraulic cylinder 65 is driven such that the contact end 62 is moved to the second movement side Dm2. That is, the contact end 62 is returned to the original position.

In the spacer alignment step S8, as shown in FIG. 11, any one of one or more spacers 90 is disposed in a gap that is formed between the rotor blade 50a and the contact end 62 due to execution of the second moving step S7. In the spacer alignment step S8, the fall prevention process for the spacer 90 is performed as necessary before the spacer 90 is disposed in the gap formed between the rotor blade 50a and the contact end 62. Specifically, one end of the wire W is attached to the hooking tool 91 provided on the spacer 90, and the other end of the wire W is attached to a fixation member that is present above the rotor blade 50a.

When the spacer alignment step S8 is finished, the first moving step S5 is executed again. Hereinafter, the first moving step S5, the determination step S6, the second moving step S7, and the spacer alignment step S8 are repeatedly executed until it is determined in the determination step S6 that the blade root 52 of the rotor blade 50a has fallen off the blade root groove 46.

Through the above-described process, removal of the rotor blade 50a from the first-stage disk 40f is finished.

Note that in the present embodiment, the spacer alignment step S8 is executed six times. In the first spacer alignment step S8, the first spacer 90a which is one of the plurality of spacers 90 and which is smallest in thickness is used. In the second spacer alignment step S8, the second spacer 90b that is thicker than the first spacer 90a is used after the first spacer 90a is removed. In the third spacer alignment step S8, the third spacer 90c thicker than the second spacer 90b is used after the second spacer 90b is removed. In the fourth spacer alignment step S8, the first spacer 90a is disposed between the third spacer 90c and the contact end 62. That is, in the fourth spacer alignment step S8, the third spacer 90c and the first spacer 90a are used. In the fifth spacer alignment step S8, the second spacer 90b is disposed between the third spacer 90c and the contact end 62 after only the first spacer 90a is removed. That is, in the fifth spacer alignment step S8, the third spacer 90c and the second spacer 90b are used. In the sixth spacer alignment step S8 which is the spacer alignment step executed last, the third spacer 90c, the second spacer 90b, and the first spacer 90a are used.

In the present embodiment, when the rotor blade 50a is to be moved to the first movement side Dm1, as described above, a reaction force in a direction from the first-stage disk 40f to the first movement side Dm1 is caused to act on the frame 70 on which the force in the direction from the rotor blade 50a to the second movement side Dm2 acts, so that the frame 70 is prevented from moving to the second movement side Dm2. At this time, the reaction force receiving portions 81 of the frame 70 receive the reaction force from the first-stage disk 40f to which the rotor blade 50a to be removed is attached. In the present embodiment, although the contact end 62 is disposed on the second movement side Dm2 with respect to the rotor blade 50a, the reaction force receiving portions 81 that receive the reaction force from the first-stage disk 40f, to which the rotor blade 50a to be removed is attached, is provided at the first base end portions 73, which are end portions of the bases 71 that are on the first movement side Dm1. Therefore, in the present embodiment, the size of a portion of the rotor blade removing device 60 in the present embodiment that is positioned on the second movement side Dm2 with respect to the rotor blade 50a to be removed can be reduced in comparison with a case where the entire rotor blade removing device is disposed on the second movement side Dm2 with respect to the rotor blade 50a to be removed.

Furthermore, in the present embodiment, since the stroke of the hydraulic cylinder 65 is shortened by using one or more spacers 90, the length of the hydraulic cylinder 65 that is disposed on the second movement side Dm2 with respect to the rotor blade 50a to be removed can be reduced in the movement direction Dm.

Therefore, in the present embodiment, the rotor blade removing device 60 in the present embodiment can be disposed on the first-stage disk 40f even in a case where a distance between the outer rear end surface 45b of the first-stage disk 40f to which the rotor blade 50a to be removed is attached and the outer front end surface 45f of the second-stage disk 40s that is adjacent to the first-stage disk 40f while being on the axial downstream side Dad with respect to the first-stage disk 40f is short.

Additionally, in the present embodiment, the hydraulic cylinder 65 is disposed such that the mechanism contact surface 86 of the pressing receiving portion 85 is positioned closer to the second height side Dh2 than the outer peripheral contact surfaces 76 of the bases 71 are and the casing bottom surface 69 of the hydraulic cylinder 65 abuts the mechanism contact surface 86. Therefore, when the rotor blade removing device 60 is disposed on the disk 40, the hydraulic cylinder 65 and the pressing receiving portion 85 are positioned closer to the radial outer side Dro than the outer peripheral surface 44 of the disk 40 is. Therefore, in the present embodiment, the rotor blade removing device 60 in the present embodiment can be disposed on the first-stage disk 40f even in a case where there is substantially no distance between the outer rear end surface 45b of the first-stage disk 40f to which the rotor blade 50a to be removed is attached and the outer front end surface 45f of the second-stage disk 40s that is adjacent to the first-stage disk 40f while being on the axial downstream side Dad with respect to the first-stage disk 40f.

As described above, in the present embodiment, the target to be removed is the rotor blade 50a attached to the first-stage disk 40f. However, in a case where a disposition space for the rotor blade 50 is present on the first movement side Dm1 with respect to the rotor blade 50 attached to the disk 40, the target to be removed may be the rotor blade 50 attached to the disk 40 in a different stage. For example, the target to be removed may be the rotor blade 50 attached to the disk 40 in the final stage.

In the present embodiment, the first movement side Dm1 corresponds to the axial upstream side Dau in the axial direction Da and the second movement side Dm2 corresponds to the axial downstream side Dad in the axial direction Da. However, in a case where the target to be removed is the rotor blade 50 attached to the disk 40 in the final stage, the first movement side Dm1 corresponds to the axial downstream side Dad in the axial direction Da and the second movement side Dm2 corresponds to the axial upstream side Dau in the axial direction Da. Therefore, the first movement side Dm1 does not need to correspond to the axial upstream side Dau in the axial direction Da as in the present embodiment and the second movement side Dm2 does not need to correspond to the axial downstream side Dad in the axial direction Da as in the present embodiment.

Additionally, in the present embodiment, the axial upstream side Dau is a first axial side and the axial downstream side Dad is a second axial side. However, the axial upstream side Dau may be the second axial side and the axial downstream side Dad may be the first axial side.

"Second Embodiment of Rotor Blade Removing Device"

Figure 12:
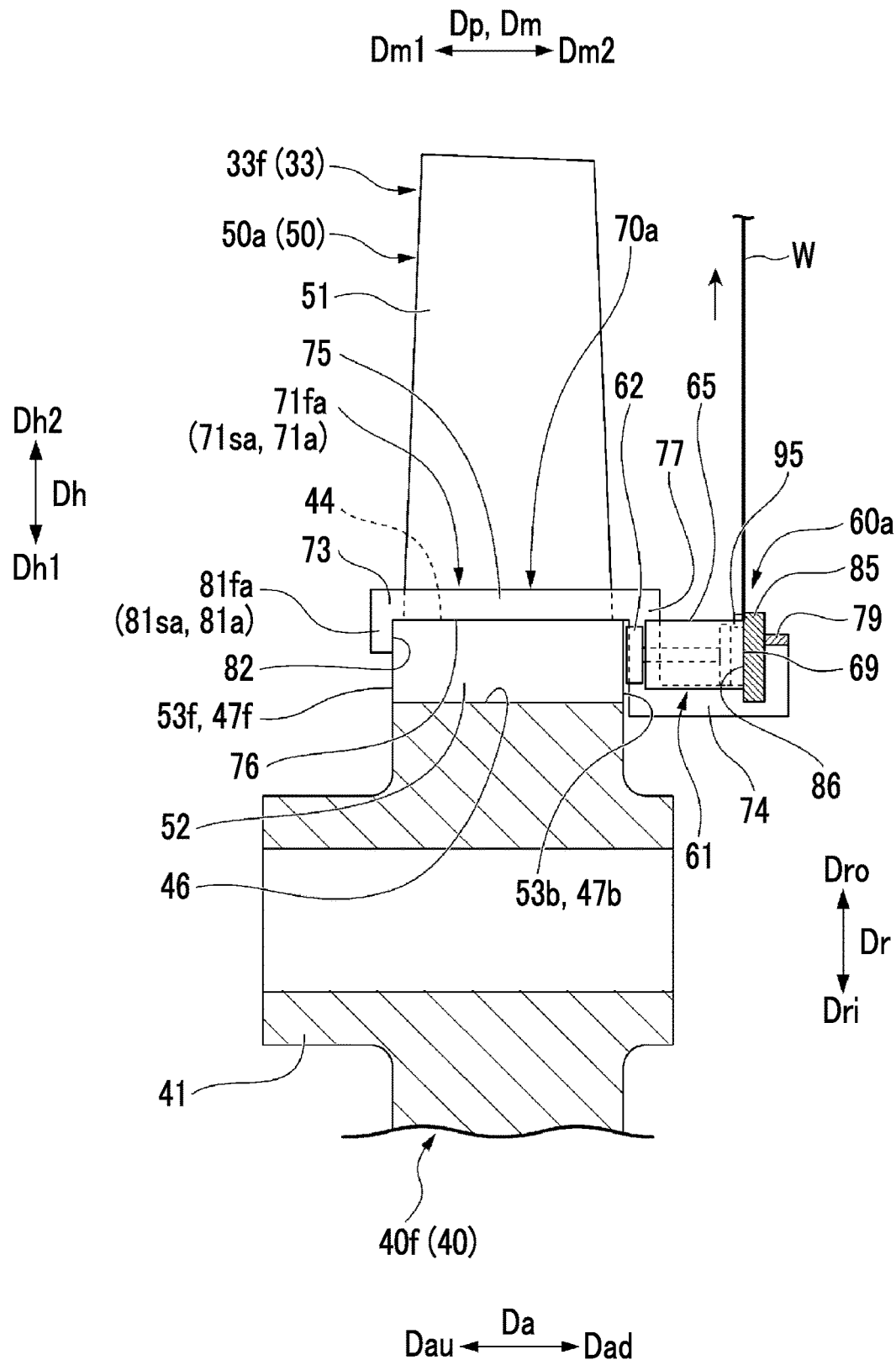
FIG. 12 is a cross-sectional view showing the main part of the rotor and the rotor blade removing device after a device alignment step in a second embodiment of the present disclosure.

A rotor blade removing device in the present embodiment will be described with reference to FIG. 12. The rotor blade removing device 60 in the first embodiment is effective in a case where the plurality of disks 40 are connected to each other and the rotor blade 50 provided on the first-stage disk 40f is to be removed. A rotor blade removing device 60a in the present embodiment is a device that is effective in a case where the plurality of disks 40 have been disconnected from each other and the rotor blade 50 provided on any of the disks 40 is to be removed.

As with the rotor blade removing device 60 in the first embodiment, the rotor blade removing device 60a in the present embodiment includes the pushing-out mechanism 61, a frame 70a to which the pushing-out mechanism 61 is attached, the plurality of spacers 90, and the hooking tools 91 and 95.

As with the pushing-out mechanism 61 in the first embodiment, the pushing-out mechanism 61 includes the contact end 62 and the hydraulic cylinder 65.

As with the frame 70 in the first embodiment, the frame 70a includes bases, the base connection portion 79, the reaction force receiving portions 81, and the pressing receiving portion 85. As with the bases 71 in the first embodiment, the bases include a first base 71fa and a second base 71sa. Each of the first base 71fa and the second base 71sa includes the first base end portion 73 which is an end portion on the first movement side Dm1, the second base end portion 74 which is an end portion on the second movement side Dm2, and the base intermediate portion 75 between the first base end portion 73 and the second base end portion 74. Furthermore, each of the first base 71fa and the second base 71sa in the present embodiment includes a shift portion 77 that extends toward the first height side Dh1 from an end portion of the base intermediate portion 75 that is on the second movement side Dm2. The second base end portion 74 is provided at an end of the shift portion 77 that is on the first height side Dh1. Therefore, the mechanism contact surface 86 of the pressing receiving portion 85 provided at the second base end portion 74 is positioned closer to the first height side Dh1 than the outer peripheral contact surfaces 76 of the bases are. Therefore, almost the entire body of hydraulic cylinder 65 abutting the mechanism contact surface 86 and almost the entire body of the contact end 62 are positioned closer to the first height side Dh1 than the outer peripheral contact surfaces 76 of the bases are.

Figure 6:
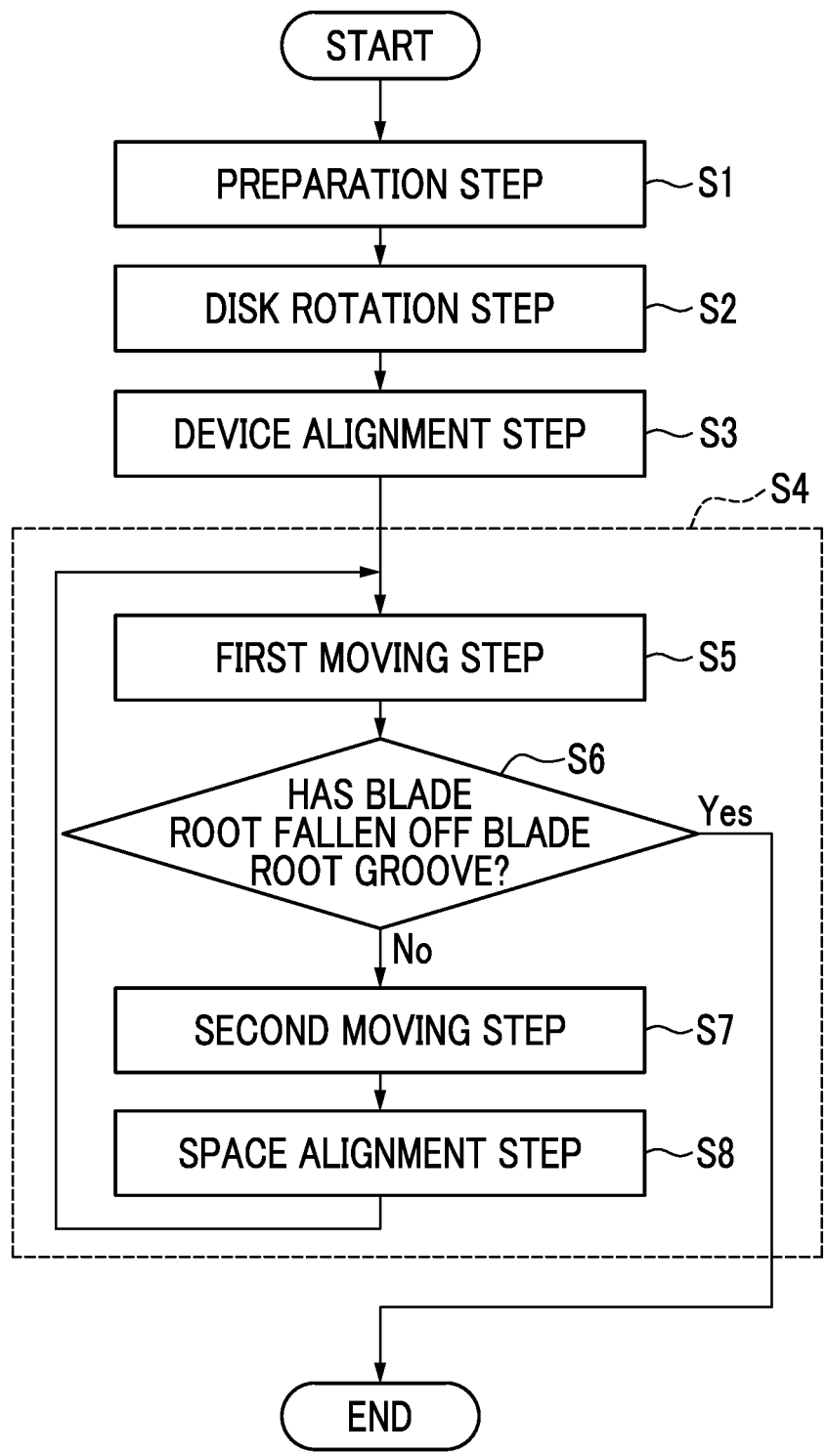
FIG. 6 is a flowchart showing the procedure for a rotor blade removal method according to an embodiment of the present disclosure.

In the present embodiment as well, the rotor blade 50 is removed from the disk 40 through the procedure shown in the flowchart of FIG. 6. However, in the device alignment step S3 in the flowchart of FIG. 6, the contact end 62 and the blade root 52 of the rotor blade 50 are caused to face each other in the movement direction Dm. Then, in the first moving step S5, the hydraulic cylinder 65 is driven such that the blade root 52 of the rotor blade 50 is pushed in the first movement direction Dm1 by means of the contact end 62 and the rotor blade 50 is moved to the first movement side Dm1 together with the contact end 62.

As described above, in the present embodiment as well, as with the rotor blade removing device 60 in the first embodiment, the size of a portion of the rotor blade removing device 60a in the present embodiment that is positioned on the second movement side Dm2 with respect to the rotor blade 50a to be removed can be reduced in comparison with a case where the entire rotor blade removing device is disposed on the second movement side Dm2 with respect to the rotor blade 50a to be removed.

However, in the present embodiment, the hydraulic cylinder 65 is disposed such that the mechanism contact surface 86 of the pressing receiving portion 85 is positioned closer to the first height side Dh1 than the outer peripheral contact surfaces 76 of the bases are and the casing bottom surface 69 of the hydraulic cylinder 65 abuts the mechanism contact surface 86. Therefore, when the rotor blade removing device 60a is disposed on the disk 40, the hydraulic cylinder 65 and the pressing receiving portion 85 are positioned closer to the radial inner side Dri than the outer peripheral surface 44 of the disk 40 is. Therefore, unlike the first embodiment, the present embodiment cannot be applied to a case where there is substantially no distance between the outer rear end surface 45b of the first-stage disk 40f to which the rotor blade 50a to be removed is attached and the outer front end surface 45f of the second-stage disk 40s that is adjacent to the first-stage disk 40f while being on the axial downstream side Dad with respect to the first-stage disk 40f.

Meanwhile, in the present embodiment, the blade root 52 of the rotor blade 50 is pushed to the first movement side Dm1 by the contact end 62 at the time of removal of the rotor blade 50. Therefore, damage to the blade body 51 of the rotor blade 50 can be suppressed.

Note that in the present embodiment as well, as described in the first embodiment, the first movement side Dm1 does not need to correspond to the axial upstream side Dau in the axial direction Da as in the present embodiment and the second movement side Dm2 does not need to correspond to the axial downstream side Dad in the axial direction Da. That is, at the time of removal of the rotor blade 50, the rotor blade 50 may be moved to the axial downstream side Dad.

In the present embodiment, the axial upstream side Dau is the first axial side and the axial downstream side Dad is the second axial side. However, as described in the first embodiment, the axial upstream side Dau may be the second axial side and the axial downstream side Dad may be the first axial side.

Modification Example

The driving mechanism in each of the above-described embodiments is the hydraulic cylinder 65. However, the driving mechanism may not be the hydraulic cylinder 65, and may be another actuator such as a pneumatic cylinder or an electromagnetic actuator.

Each of the above-described embodiments is an example in which the rotor blade 50 in the compressor 30 of the gas turbine is removed. However, the target to be removed in the present invention is not limited to the rotor blade 50 in the compressor 30 of the gas turbine. The target to be removed may be a rotor blade of another axial flow rotary machine.

The embodiments of the present disclosure have been described above. However, the present disclosure is not limited to the above-described embodiments. Various additions, changes, replacements, partial deletions, and the like are possible within a scope which does not depart from the conceptual idea and gist of the present invention which are derived from the content defined in the claims and equivalents thereof.

APPENDIX

For example, the rotor blade removing device in the above-described embodiments is understood as follows.

(1) The rotor blade removing device according to a first aspect is the rotor blade removing devices 60 and 60a for removal of the rotor blade 50 from the disk 40. The disk 40 includes the outer peripheral surface 44 that extends in the circumferential direction Dc around the axis Ar, a first end surface 45f (or 45b) facing the first axial side Dau (or Dad) which is one of both sides in the axial direction Da in which the axis Ar extends, a second end surface 45b (or 45f) facing the second axial side Dad (or Dau) opposite to the first axial side Dau (or Dad), and the blade root groove 46. The first end surface 45f (or 45b) extends toward the radial inner side Dri with respect to the axis Ar from an edge of the outer peripheral surface 44 that is on the first axial side Dau (or Dad). The second end surface 45b (or 45f) extends toward the radial inner side Dri from an edge of the outer peripheral surface 44 that is on the second axial side Dad (or Dau). The blade root groove 46 is recessed toward the radial inner side Dri from the outer peripheral surface 44 and extends from the second end surface 45b (or 45f) in the groove penetration direction Dp twisted with respect to the axial direction Da to penetrate to the first end surface 45f (or 45b). The rotor blade 50 includes the blade body 51 of which a cross-sectional shape perpendicular to the radial direction Dr with respect to the axis Ar is a blade-like shape and that extends in the radial direction Dr and the blade root 52 that is provided on the radial inner side Dri with respect to the blade body 51 and that is fitted to the blade root groove 46.

The rotor blade removing devices 60 and 60a include the pushing-out mechanism 61 and the frames 70 and 70a to which the pushing-out mechanism 61 is attached. The pushing-out mechanism 61 includes the contact end 62 that can come into contact with the rotor blade 50, and the driving mechanism 65 that moves the contact end 62 in the movement direction Dm. The frames 70 and 70a include the bases 71 and 71a that extend in the movement direction Dm, the reaction force receiving portion 81 that extends toward the first height side Dh1, which is one of both sides in the height direction Dh different t from the movement direction Dm, from the first base end portions 73, which are end portions of the bases 71 and 71a that are on the first movement side Dm1 which is one of both sides in the movement direction Dm, and the pressing receiving portion 85 that is provided on the second base end portions 74, which are end portions of the bases 71 and 71a that are on the second movement side Dm2 opposite to the first movement side Dm1. The bases 71 and 71a include the outer peripheral contact surface 76 that faces the first height side Dh1 and that can come into contact with the outer peripheral surface 44. The reaction force receiving portion 81 extends toward the first height side Dh1 from an end of the outer peripheral contact surface 76 that is on the first movement side Dm1 and includes the end contact surface 82 that faces the second movement side Dm2 and that can come into contact with the first end surface 45f (or 45b). The pressing receiving portion 85 includes the mechanism contact surface 86 that faces the first movement side Dm1 and that can come into contact with the mechanism end surface 69 that faces the second movement side Dm2 at the driving mechanism 65.

In the present aspect, when the rotor blade 50 is to be moved to the first movement side Dm1, a reaction force in a direction from the disk 40 to the first movement side Dm1 is caused to act on the frames 70 and 70a on which the force in the direction from the rotor blade 50 to the second movement side Dm2 acts, so that the frames 70 and 70a are prevented from moving to the second movement side Dm2. At this time, the reaction force receiving portions 81 of the frames 70 and 70a receive the reaction force from the disk 40 to which the rotor blade 50a to be removed is attached. In the present aspect, although the contact end 62 is disposed on the second movement side Dm2 with respect to the rotor blade 50, the reaction force receiving portions 81 that receive the reaction force from the disk 40, to which the rotor blade 50 to be removed is attached, is provided at the first base end portions 73, which are end portions of the bases 71 and 71a that are on the first movement side Dm1. Therefore, in the present aspect, the size of a portion of the rotor blade removing devices 60 and 60*a* in the present aspect that is positioned on the second movement side Dm2 with respect to the rotor blade 50 to be removed can be reduced in comparison with a case where the entire rotor blade removing device is disposed on the second movement side Dm2 with respect to the rotor blade 50 to be removed.

Therefore, in the present aspect, the rotor blade removing devices 60 and 60*a* can be disposed on the disk 40 to which the rotor blade 50 to be removed is attached even in a case where a distance between the second end surface 45*b* (or 45*f*) of the disk 40 to which the rotor blade 50 to be removed is attached and the first end surface 45*f* (or 45*b*) of another disk 40 that is adjacent to the disk 40 while being on the second axial side Dad (or Dau) with respect to the disk 40 is short.

(2) The rotor blade removing device according to a second aspect is the rotor blade removing devices 60 and 60*a* in the first aspect in which the driving mechanism 65 is a fluid-pressure cylinder that includes the piston rod 66 that extends toward the second movement side Dm2 from the contact end 62, the piston 67 that is provided at an end of the piston rod 66 that is on the second movement side Dm2, and the cylinder casing 68 that covers the piston 67 such that the piston 67 is movable in the movement direction Dm. The mechanism end surface 69 is the casing bottom surface 69 that faces the second movement side Dm2 at the cylinder casing 68.

(3) The rotor blade removing device according to a third aspect is the rotor blade removing device 60 in the first or second aspect in which the mechanism contact surface 86 is positioned on the second height side Dh2 with respect to the outer peripheral contact surface 76, the second height side Dh2 being opposite to the first height side Dh1. The contact end 62 faces, in the movement direction Dm, an edge of the blade body 51 that is on the second movement side Dm2 when the outer peripheral contact surface 76 of the base 71 is brought into contact with the outer peripheral surface 44.

The mechanism contact surface 86 in the present aspect is positioned on the second height side Dh2 with respect to the outer peripheral contact surface 76. Additionally, in the present aspect, the contact end 62 faces, in the movement direction Dm, the edge of the blade body 51 that is on the second movement side Dm2 when the outer peripheral contact surface 76 of the base 71 is brought into contact with the outer peripheral surface 44 of the disk 40. Therefore, in the present aspect, when the rotor blade removing device 60 is disposed on the disk 40, the driving mechanism 65 and the pressing receiving portion 85 are positioned closer to the radial outer side Dro than the outer peripheral surface 44 of the disk 40 is. Therefore, in the present aspect, the rotor blade removing device 60 can be disposed on the disk 40 to which the rotor blade 50 to be removed is attached even in a case where there is substantially no distance between the second end surface 45*b* (or 45*f*) of the disk 40 to which the rotor blade 50 to be removed is attached and the first end surface 45*f* (or 45*b*) of another disk 40 that is adjacent to the disk 40 while being on the second axial side Dad (or Dau) with respect to the disk 40.

(4) The rotor blade removing device according to a fourth aspect is the rotor blade removing device 60*a* in the first or second aspect in which the mechanism contact surface 86 is positioned on the first height side Dh1 with respect to the outer peripheral contact surface 76. The contact end 62 faces, in the movement direction Dm, an edge of the blade root 52 that is on the second movement side Dm2 when the outer peripheral contact surface 76 of the base is brought into contact with the outer peripheral surface 44.

According to the present aspect, it is possible to drive the driving mechanism 65 such that the blade root 52 of the rotor blade 50 is pushed to the first movement side Dm1 by the contact end 62. Therefore, according to the present aspect, damage to the blade body 51 of the rotor blade 50 can be suppressed at the time of removal of the rotor blade 50.

(5) The rotor blade removing device according to a fifth aspect is the rotor blade removing devices 60 and 60*a* in any one of the first to fourth aspects in which the bases 71 and 71*a* include the first bases 71*f* and 71*fa* and the second bases 71*s* and 71*sa* that extend in the movement direction Dm. The reaction force receiving portions 81 include the first reaction force receiving portion 81*f* that extends toward the first height side Dh1 from the first base end portion 73 of the first bases 71*f* and 71*fa* that is an end portion on the first movement side Dm1 and the second reaction force receiving portion 81*s* that extends toward the first height side Dh1 from the first base end portion 73 of the second bases 71*s* and 71*sa* that is an end portion on the first movement side Dm1. Each of the first bases 71*f* and 71*fa* and the second bases 71*s* and 71*sa* includes the outer peripheral contact surface 76. Each of the first reaction force receiving portion 81*f* and the second reaction force receiving portion 81*s* includes the end contact surface 82. The height direction Dh is a direction perpendicular to the movement direction Dm and a direction perpendicular to the height direction Dh and the movement direction Dm is the width direction Dw. The second bases 71*s* and 71*sa* are disposed to be separated from the first bases 71*f* and 71*fa* in the width direction Dw. The pushing-out mechanism 61 is disposed between the first bases 71*f* and 71*fa* and the second bases 71*s* and 71*sa*. The pressing receiving portion 85 is provided on the second base end portion 74 of the first bases 71*f* and 71*fa* that is an end on the second movement side Dm2 and the second base end portion 74 of the second bases 71*s* and 71*sa* that is on the second movement side Dm2 such that the mechanism contact surface 86 is positioned between the first bases 71*f* and 71*fa* and the second bases 71*s* and 71*sa*.

(6) The rotor blade removing device according to a sixth aspect is the rotor blade removing devices 60 and 60*a* in the fifth aspect in which the frames 70 and 70*a* further include the base connection portion 79 that is disposed on the second movement side Dm2 with respect to the first bases 71*f* and 71*fa* and the second bases 71*s* and 71*sa* and that connects the first bases 71*f* and 71*fa* and the second bases 71*s* and 71*sa* to each other.

(7) The rotor blade removing device according to a seventh aspect is the rotor blade removing devices 60 and 60*a* in any one of the first to sixth aspects, further including the hooking tool 95 that is provided on the frames 70 and 70*a* and that includes the hooking portion 95*h* on which the wire W is hookable.

According to the present aspect, one end of the wire W is attached to the hooking tool 95 and the other end of the wire W is attached to a fixation member that is present above the rotor blade 50 to be removed, so that the frames 70 and 70*a* can be prevented from falling.

(8) The rotor blade removing device according to an eighth aspect is the rotor blade removing devices 60 and 60*a* in any one of the first to seventh aspects, further including one or more spacers 90 that can be disposed between the rotor blade 50 and the contact end 62 in the movement direction Dm.

According to the present aspect, the stroke of the driving mechanism 65 in the movement direction Dm can be shortened since the one or more spacers 90 are used. Therefore, according to the present aspect, the length of the driving mechanism 65 that is disposed on the second movement side Dm2 with respect to the rotor blade 50 to be removed can be reduced in the movement direction Dm.

(9) The rotor blade removing device according to a ninth aspect is the rotor blade removing devices 60 and 60a in the eighth aspect, further including the hooking tool 91 that is provided on the one or more spacers 90 and that includes the hooking portion 91h on which the wire W is hookable.

According to the present aspect, one end of the wire W is attached to the hooking tool 91 and the other end of the wire W is attached to a fixation member that is present above the rotor blade 50 to be removed, so that the spacer 90 can be prevented from falling.

For example, the rotor blade removal method in the above-described embodiments is understood as follows.

(10) The rotor blade removal method in a tenth aspect is a rotor blade removal method for removal of the rotor blade 50 from the disk 40. The disk 40 includes the outer peripheral surface 44 that extends in the circumferential direction Dc around the axis Ar, a first end surface 45f (or 45b) facing the first axial side Dau (or Dad) which is one of both sides in the axial direction Da in which the axis Ar extends, a second end surface 45b (or 45f) facing the second axial side Dad (or Dau) opposite to the first axial side Dau (or Dad), and the blade root groove 46. The first end surface 45f (or 45b) extends toward the radial inner side Dri with respect to the axis Ar from an edge of the outer peripheral surface 44 that is on the first axial side Dau (or Dad). The second end surface 45b (or 45f) extends toward the radial inner side Dri from an edge of the outer peripheral surface 44 that is on the second axial side Dad (or Dau). The blade root groove 46 is recessed toward the radial inner side Dri from the outer peripheral surface 44 and extends from the second end surface 45b (or 45f) in the groove penetration direction Dp twisted with respect to the axial direction Da to penetrate to the first end surface 45f (or 45b). The rotor blade 50 includes the blade body 51 of which a cross-sectional shape perpendicular to the radial direction Dr with respect to the axis Ar is a blade-like shape and that extends in the radial direction Dr and the blade root 52 that is provided on the radial inner side Dri with respect to the blade body 51 and that is fitted to the blade root groove 46.

The rotor blade removal method includes executing the preparation step S1 of preparing the rotor blade removing devices 60 and 60a, executing the device alignment step S3 of disposing the rotor blade removing devices 60 and 60a on the disk 40, and executing the rotor blade moving step S4 of operating the rotor blade removing devices 60 and 60a such that the rotor blade 50 attached to the disk 40 is moved. The rotor blade removing devices 60 and 60a prepared in the preparation step S1 include the pushing-out mechanism 61 and the frames 70 and 70a to which the pushing-out mechanism 61 is attached. The pushing-out mechanism 61 includes the contact end 62 that can come into contact with the rotor blade 50, and the driving mechanism 65 that moves the contact end 62 in the movement direction Dm. The frames 70 and 70a include the bases 71 and 71a that extend in the movement direction Dm, the reaction force receiving portion 81 that extends toward the first height side Dh1, which is one of both sides in the height direction Dh different from the movement direction Dm, from the first base end portions 73, which are end portions of the bases 71 and 71a that are on the first movement side Dm1 which is one of both sides in the movement direction Dm, and the pressing receiving portion 85 that is provided on the second base end portions 74, which are end portions of the bases 71 and 71a that are on the second movement side Dm2 opposite to the first movement side Dm1. The bases 71 and 71a include the outer peripheral contact surface 76 that faces the first height side Dh1 and that can come into contact with the outer peripheral surface 44. The reaction force receiving portion 81 extends toward the first height side Dh1 from an end of the outer peripheral contact surface 76 that is on the first movement side Dm1 and includes the end contact surface 82 that faces the second movement side Dm2 and that can come into contact with the first end surface 45f (or 45b). The pressing receiving portion 85 includes the mechanism contact surface 86 that faces the first movement side Dm1 and that can come into contact with the mechanism end surface 69 that faces the second movement side Dm2 at the driving mechanism 65. In the device alignment step S3, the movement direction Dm of the contact end 62 is made parallel to the groove penetration direction Dp, the outer peripheral contact surface 76 of the bases 71 and 71a is brought into contact with the outer peripheral surface 44, the end contact surface 82 of the reaction force receiving portion 81 is brought into contact with the first end surface 45f (or 45b), the contact end 62 is disposed on the second movement side Dm2 with respect to the rotor blade 50, and the contact end 62 and the rotor blade 50 are caused to face each other in the movement direction Dm. In the rotor blade moving step S4, the driving mechanism 65 is driven such that the contact end 62 is moved to the first movement side Dm1 and the rotor blade 50 is moved to the first movement side Dm1.

In the rotor blade removal method of the present aspect, as with the rotor blade removing device in the first aspect, the rotor blade removing devices 60 and 60a can be disposed on the disk 40 to which the rotor blade 50 to be removed is attached even in a case where a distance between the second end surface 45b (or 45f) of the disk 40 to which the rotor blade 50 to be removed is attached and the first end surface 45f (or 45b) of another disk 40 that is adjacent to the disk 40 while being on the second axial side Dad (or Dau) with respect to the disk 40 is short.

(11) The rotor blade removal method according to an eleventh aspect is the rotor blade removal method in the tenth aspect in which the rotor blade removing devices 60 and 60a further include one or more spacers 90 that can be disposed between the rotor blade 50 and the contact end 62 in the movement direction Dm. The rotor blade moving step S4 includes the first moving step S5 of driving the driving mechanism 65 such that the rotor blade 50 is moved to the first movement side Dm1 together with the contact end 62, the determination step S6 of determining whether or not the blade root 52 of the rotor blade 50 has fallen off the blade root groove 46 as a result of the movement of the rotor blade 50 in the first moving step S5, the second moving step S7 of driving the driving mechanism 65 such that the contact end 62 is moved to the second movement side Dm2 in a case where it is determined in the determination step S6 that the blade root 52 of the rotor blade 50 has not fallen off the blade root groove 46, and the spacer alignment step S8 of disposing any one of the one or more spacers 90 between the rotor blade 50 and the contact end 62 after the second moving step S7. The first moving step S5 and the determination step S6 are executed after the spacer alignment step S8. The first moving step S5, the determination step S6, the second moving step S7, and the spacer alignment step S8 are repeatedly executed until it is determined in the determination step S6 that the blade root 52 of the rotor blade 50 has fallen off the blade root groove 46.

According to the present aspect, as with the rotor blade removing devices 60 and 60a in the eighth aspect, the stroke of the driving mechanism 65 in the movement direction Dm can be shortened since the one or more spacers 90 are used in the rotor blade moving step S4. Therefore, also in the case of the rotor blade removal method in the present aspect, the length of the driving mechanism 65 that is disposed on the second movement side Dm2 with respect to the rotor blade 50a to be removed can be reduced in the movement direction Dm.

(12) The rotor blade removal method according to a twelfth aspect is the rotor blade removal method in the tenth or eleventh aspect in which the disk rotation step S2 of rotating the disk 40 is executed before the device alignment step S3. In the disk rotation step S2, the disk 40 is rotated around the axis Ar such that at least a portion of a first blade root end surface 53f (or 53b) out of the first blade root end surface 53f (or 53b) facing the first movement side Dm1 and a second blade root end surface 53b (or 53f) facing the second movement side Dm2 is positioned closer to an upper side than the axis Ar is and is positioned closer to the upper side than the second blade root end surface 53b (or 53f) is, the first blade root end surface 53f (or 53b) and the second blade root end surface 53b (or 53f) being surfaces of the blade root 52 fitted to the blade root groove 46.

In a case where at least a portion of the first blade root end surface 53f (or 53b) of the rotor blade 50 to be removed is positioned to be closer to the upper side than the axis Ar is, a portion of the outer peripheral surface 44 of the disk 40 that is adjacent to the rotor blade 50 faces a direction including a component in a vertically upward direction. Therefore, in the present aspect, because of the gravity acting on the bases 71 and 71a, a contact property between the outer peripheral contact surface 76 of the bases 71 and 71a and a portion of the outer peripheral surface 44 of the stage disk 40 that is adjacent to the blade root 52 can be ensured. In a case where the first blade root end surface 53f (or 53b) is positioned to be closer to the upper side than the second blade root end surface 53b (or 53f) is, a portion of the rotor blade removing devices 60 and 60a that is on the second movement side Dm2 is positioned below a portion of the rotor blade removing devices 60 and 60a that is on the first movement side Dm1 when the rotor blade removing devices 60 and 60a are disposed on the disk 40. Therefore, among the components of the gravity acting on the rotor blade removing devices 60 and 60a, a component in the movement direction Dm becomes a component facing the second movement side Dm2. Therefore, the gravity causes the rotor blade removing devices 60 and 60a to move to the second movement side Dm2. However, even in a case where the rotor blade removing devices 60 and 60a are caused to move to the second movement side Dm2, the rotor blade removing devices 60 and 60a cannot move to the second movement side Dm2 since the end contact surfaces 82 of the rotor blade removing devices 60 and 60a are in contact with the first end surface 45f (or 45b) of the disk 40.

(13) The rotor blade removal method according to a thirteenth aspect is the rotor blade removal method in any one of the tenth to twelfth aspects in which the mechanism contact surface 86 of the rotor blade removing device 60 is positioned on the second height side Dh2 with respect to the outer peripheral contact surface 76, the second height side Dh2 being opposite to the first height side Dh1. In the device alignment step S3, the contact end 62 and the blade body 51 of the rotor blade 50 are caused to face each other in the movement direction Dm.

In the present aspect, as with the rotor blade removing device 60 in the third aspect, the rotor blade removing device 60 can be disposed on the disk 40 to which the rotor blade 50 to be removed is attached even in a case where there is substantially no distance between the second end surface 45b (or 45f) of the disk 40 to which the rotor blade 50 to be removed is attached and the first end surface 45f (or 45b) of another disk 40 that is adjacent to the disk 40 while being on the second axial side Dad (or Dau) with respect to the disk 40.

(14) The rotor blade removal method according to a fourteenth aspect is the rotor blade removal method in any one of the tenth to twelfth aspects in which the mechanism contact surface 86 of the rotor blade removing device 60a is positioned on the first height side Dh1 with respect to the outer peripheral contact surface 76. In the device alignment step S3, the contact end 62 and the blade root 52 of the rotor blade 50 are caused to face each other in the movement direction Dm.

According to the present aspect, as with the rotor blade removing device 60a in the fourth aspect, damage to the blade body 51 of the rotor blade 50 can be suppressed at the time of removal of the rotor blade 50.

INDUSTRIAL APPLICABILITY

According to an aspect of the present invention, it is possible to remove a rotor blade from a disk even in a case where a distance between a rear end surface of an upstream-side disk and a front end surface of a downstream-side disk is small.

REFERENCE SIGNS LIST

1: gas turbine
2: gas turbine rotor
5: gas turbine casing
6: intermediate casing
10: turbine
11: turbine rotor
12: rotor shaft
13: rotor blade row
15: turbine casing
17: stator vane row
20: combustor
30: compressor
31: compressor rotor
32: rotor shaft
33: rotor blade row
33f: first-stage rotor blade row
33s: second-stage rotor blade row
35: compressor casing
37: stator vane row
40: disk
40f: first-stage disk
40s: second-stage disk 41: body portion
42f: inner front end surface
42b: inner rear end surface
43: rotor blade attachment portion
44: outer peripheral surface
45f: outer front end surface
45b: outer rear end surface
46: blade root groove
47f: front end opening
47b: rear end opening
50: rotor blade
50a: rotor blade to be removed
51: blade body
52: blade root
53f: blade root front end surface (first blade root end surface)
53b: blade root rear end surface (second blade root end surface)
60, 60a: rotor blade removing device
61: pushing-out mechanism
62: contact end
65: hydraulic cylinder (driving mechanism)
66: piston rod
67: piston
68: cylinder casing
69: casing bottom surface (mechanism end surface)
70, 70a: frame
71, 71a: base
71f, 71fa: first base
71s, 71sa: second base
73: first base end portion
74: second base end portion
75: base intermediate portion
76: outer peripheral contact surface
77: shift portion
79: base connection portion
81: reaction force receiving portion
81f: first reaction force receiving portion
81s: second reaction force receiving portion
82: end contact surface
85: pressing receiving portion
86: mechanism contact surface
90: spacer
90a: first spacer
90b: second spacer
90c: third spacer
91: hooking tool
91h: hooking portion
95: hooking tool
95h: hooking portion
A: air
F: fuel
W: wire
Da: axial direction
Dau: axial upstream side (first axial side)
Dad: axial downstream side (second axial side)
Dc: circumferential direction
Dr: radial direction
Dri: radial inner side
Dro: radial outer side
Dm: movement direction
Dm1: first movement side
Dm2: second movement side
Dh: height direction
Dh1: first height side
Dh2: second height side
Dw: width direction
Dp: groove penetration direction

The invention claimed is:

1. A rotor blade removing device for removal of a rotor blade from a disk, the disk including an outer peripheral surface that extends in a circumferential direction around an axis, a first end surface that faces a first axial side which is one of both-two sides in an axial direction in which the axis extends, a second end surface that faces a second axial side opposite to the first axial side, and a blade root groove, the first end surface extending toward a radial inner side with respect to the axis from an edge of the outer peripheral surface that is on the first axial side, the second end surface extending toward the radial inner side from an edge of the outer peripheral surface that is on the second axial side, the blade root groove being recessed toward the radial inner side from the outer peripheral surface and extending from the second end surface in a groove penetration direction twisted with respect to the axial direction to penetrate to the first end surface, the rotor blade including a blade body of which a cross-sectional shape perpendicular to a radial direction with respect to the axis is a blade-like shape and that extends in the radial direction and a blade root that is provided on the radial inner side with respect to the blade body and that is fitted to the blade root groove, the rotor blade removing device comprising:
 a pushing-out mechanism; and
 a frame to which the pushing-out mechanism is attached,
 wherein the pushing-out mechanism includes a contact end that can come into contact with the rotor blade and an actuator that moves the contact end in a movement direction,
 the frame includes
  a base that extends in the movement direction,
  a reaction force receiving portion that extends toward a first height side, which is one of two sides in a height direction different from the movement direction, from a first base end portion, which is an end portion of the base that is on a first movement side which is one of two sides in the movement direction, and
  a pressing receiving portion that is provided on a second base end portion, which is an end portion of the base that is on a second movement side opposite to the first movement side,
 the base includes an outer peripheral contact surface that faces the first height side and that can come into contact with the outer peripheral surface,
 the reaction force receiving portion extends toward the first height side from an end of the outer peripheral contact surface that is on the first movement side and includes an end contact surface that faces the second movement side and that can come into contact with the first end surface,
 the pressing receiving portion includes a mechanism contact surface that faces the first movement side and that can come into contact with a mechanism end surface that faces the second movement side at the actuator, and
 the rotor blade removing device further comprises one or more spacers that can be disposed between the rotor blade and the contact end in the movement direction.

2. The rotor blade removing device according to claim 1, wherein the bases include a first base and a second base that extend in the movement direction,
 the reaction force receiving portions include a first reaction force receiving portion that extends toward the first height side from a first base end portion of the first base that is an end portion on the first movement side and a second reaction force receiving portion that extends toward the first height side from a first base end portion of the second base that is an end portion on the first movement side,
each of the first base and the second base includes the outer peripheral contact surface,
each of the first reaction force receiving portion and the second reaction force receiving portion includes the end contact surface,
the height direction is a direction perpendicular to the movement direction and a direction perpendicular to the height direction and the movement direction is a width direction,
the second base is disposed to be separated from the first base in the width direction,
the pushing-out mechanism is disposed between the first base and the second base, and
the pressing receiving portion is provided on a second base end portion of the first base that is an end on the second movement side and a second base end portion of the second base that is on the second movement side such that the mechanism contact surface is positioned between the first base and the second base.

3. The rotor blade removing device according to claim 2, wherein the frame further includes a base connection portion that is disposed on the second movement side with respect to the first base and the second base and that connects the first base and the second base to each other.

4. The rotor blade removing device according to claim 1, wherein the actuator is a fluid-pressure cylinder that includes
 a piston rod that extends toward the second movement side from the contact end,
 a piston that is provided at an end of the piston rod that is on the second movement side, and
 a cylinder casing that covers the piston such that the piston is movable in the movement direction, and
the mechanism end surface is a casing bottom surface that faces the second movement side at the cylinder casing.

5. The rotor blade removing device according to claim 1, wherein the mechanism contact surface is positioned on a second height side with respect to the outer peripheral contact surface, the second height side being opposite to the first height side, and
the contact end faces, in the movement direction, an edge of the blade body that is on the second movement side when the outer peripheral contact surface of the base is brought into contact with the outer peripheral surface.

6. The rotor blade removing device according to claim 1, wherein the mechanism contact surface is positioned on the first height side with respect to the outer peripheral contact surface, and
the contact end faces, in the movement direction, an edge of the blade root that is on the second movement side when the outer peripheral contact surface of the base is brought into contact with the outer peripheral surface.

7. The rotor blade removing device according to claim 1, further comprising:
 a hooking tool that is provided on the frame and that includes a hooking portion on which a wire is hookable.

8. The rotor blade removing device according to claim 1, further comprising:
 a hooking tool that is provided on the one or more spacers and that includes a hooking portion on which a wire is hookable.

9. A rotor blade removal method for removal of a rotor blade from a disk, the disk including an outer peripheral surface that extends in a circumferential direction around an axis, a first end surface that faces a first axial side which is one of two sides in an axial direction in which the axis extends, a second end surface that faces a second axial side opposite to the first axial side, and a blade root groove, the first end surface extending toward a radial inner side with respect to the axis from an edge of the outer peripheral surface that is on the first axial side, the second end surface extending toward the radial inner side from an edge of the outer peripheral surface that is on the second axial side, the blade root groove being recessed toward the radial inner side from the outer peripheral surface and extending from the second end surface in a groove penetration direction twisted with respect to the axial direction to penetrate to the first end surface, the rotor blade including a blade body of which a cross-sectional shape perpendicular to a radial direction with respect to the axis is a blade-like shape and that extends in the radial direction and a blade root that is provided on the radial inner side with respect to the blade body and that is fitted to the blade root groove, the rotor blade removal method comprising:
 executing a preparation step of preparing a rotor blade removing device;
 executing a device alignment step of disposing the rotor blade removing device on the disk; and
 executing a rotor blade moving step of operating the rotor blade removing device such that the rotor blade attached to the disk is moved,
wherein the rotor blade removing device prepared in the preparation step includes
 a pushing-out mechanism, and
 a frame to which the pushing-out mechanism is attached,
the pushing-out mechanism includes a contact end that can come into contact with the rotor blade and an actuator that moves the contact end in a movement direction,
the frame includes
 a base that extends in the movement direction,
 a reaction force receiving portion that extends toward a first height side, which is one of two sides in a height direction different from the movement direction, from a first base end portion, which is an end portion of the base that is on a first movement side which is one of two sides in the movement direction, and
 a pressing receiving portion that is provided on a second base end portion, which is an end portion of the base that is on a second movement side opposite to the first movement side,
the base includes an outer peripheral contact surface that faces the first height side and that can come into contact with the outer peripheral surface,
the reaction force receiving portion extends toward the first height side from an end of the outer peripheral contact surface that is on the first movement side and includes an end contact surface that faces the second movement side and that can come into contact with the first end surface,
the pressing receiving portion includes a mechanism contact surface that faces the first movement side and that can come into contact with a mechanism end surface that faces the second movement side at the actuator, the rotor blade removing device further includes one or more spacers that can be disposed between the rotor blade and the contact end in the movement direction, in the device alignment step, the movement direction of the contact end is made parallel to the groove penetration direction, the outer peripheral contact surface of the base is brought into contact with the outer peripheral surface, the end contact surface of the reaction force receiving portion is brought into contact with the first end surface, the contact end is disposed on the second movement side with respect to the rotor blade, and the contact end and the rotor blade are caused to face each other in the movement direction, and in the rotor blade moving step, the actuator is driven such that the contact end is moved to the first movement side and the rotor blade is moved to the first movement side.

10. The rotor blade removal method according to claim 9, wherein the rotor blade moving step includes a first moving step of driving the actuator such that the rotor blade is moved to the first movement side together with the contact end, a determination step of determining whether or not the blade root of the rotor blade has fallen off the blade root groove as a result of movement of the rotor blade in the first moving step, a second moving step of driving the actuator such that the contact end is moved to the second movement side in a case where it is determined in the determination step that the blade root of the rotor blade has not fallen off the blade root groove, and a spacer alignment step of disposing any one of the one or more spacers between the rotor blade and the contact end after the second moving step, the first moving step and the determination step are executed after the spacer alignment step, and the first moving step, the determination step, the second moving step, and the spacer alignment step are repeatedly executed until it is determined in the determination step that the blade root of the rotor blade has fallen off the blade root groove.

11. The rotor blade removal method according to claim 9, wherein a disk rotation step of rotating the disk is executed before the device alignment step, and in the disk rotation step, the disk is rotated around the axis such that at least a portion of a first blade root end surface out of the first blade root end surface facing the first movement side and a second blade root end surface facing the second movement side is positioned closer to an upper side than the axis is and is positioned closer to the upper side than the second blade root end surface is, the first blade root end surface and the second blade root end surface being surfaces of the blade root fitted to the blade root groove.

12. The rotor blade removal method according to claim 9, wherein the mechanism contact surface of the rotor blade removing device is positioned on a second height side with respect to the outer peripheral contact surface, the second height side being opposite to the first height side, and in the device alignment step, the contact end and the blade body of the rotor blade are caused to face each other in the movement direction.

13. The rotor blade removal method according to claim 9, wherein the mechanism contact surface of the rotor blade removing device is positioned on the first height side with respect to the outer peripheral contact surface, and in the device alignment step, the contact end and the blade root of the rotor blade are caused to face each other in the movement direction.

\* \* \* \* \*